US012621069B2

(12) United States Patent
Hehn et al.

(10) Patent No.: US 12,621,069 B2
(45) Date of Patent: May 5, 2026

(54) EQUIVARIANT SPATIALLY-CONSISTENT WIRELESS CHANNEL MODELS

(71) Applicant: QUALCOMM Incorporated, San Diego, CA (US)

(72) Inventors: Thomas Markus Hehn, Delft (NL); Markus Peschl, Amsterdam (NL); Tribhuvanesh Orekondy, Wettingen (CH); Arash Behboodi, Amsterdam (NL); Johann Hinrich Brehmer, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 18/663,932

(22) Filed: May 14, 2024

(65) Prior Publication Data

US 2025/0358030 A1     Nov. 20, 2025

(51) Int. Cl.
*H04B 17/391*     (2015.01)
*G01S 5/02*      (2010.01)

(52) U.S. Cl.
CPC ...... *H04B 17/3913* (2015.01); *G01S 5/02524* (2020.05)

(58) Field of Classification Search
CPC ...... G01S 5/02524; G06N 3/045; G06N 3/08; H04B 17/3913
See application file for complete search history.

(56) References Cited

U.S. PATENT DOCUMENTS

| | | | | |
|---|---|---|---|---|
| 9,015,093 B1* | 4/2015 | Commons | .............. | G06N 3/042 |
| | | | | 706/26 |
| 10,309,812 B1* | 6/2019 | Zhang | ........................ | G01F 1/86 |
| 2020/0412431 A1* | 12/2020 | Park | ...................... | H04B 7/0469 |
| 2022/0121884 A1* | 4/2022 | Zadeh | ..................... | G06N 3/006 |
| 2023/0085270 A1* | 3/2023 | Zirwas | ................ | H04L 25/0254 |
| | | | | 370/252 |
| 2024/0296623 A1* | 9/2024 | Huang | ..................... | G06T 17/00 |
| 2024/0383132 A1* | 11/2024 | Brehmer | ................. | B25J 9/163 |
| 2025/0088232 A1* | 3/2025 | Hao | ...................... | H04B 7/0617 |

(Continued)

OTHER PUBLICATIONS

International Search Report and Written Opinion—PCT/US2025/019604—ISA/EPO—Jul. 2, 2025.

(Continued)

*Primary Examiner* — Peter M Bythrow
(74) *Attorney, Agent, or Firm* — Polsinelli LLP

(57) ABSTRACT

Systems and techniques are described herein for operating an apparatus having a geometric algebra transformer. An apparatus to predict link properties between a transmitter and a receiver in a three-dimensional space can include one or more processor; and a computer-readable medium storing instructions which, when executed by the one or more processor, cause the one or more processor to be configured to: receive a three-dimensional geometry, a transmitter position and a receiver position; and predict, based on a neural network wireless channel model, network link properties related to one or more channel between the transmitter position and the receiver position. Other tasks can be performed as well such as inferring wall position and/or orientation in the three-dimensional geometry based on a map of reference signal received power in a portion of the three-dimensional geometry.

20 Claims, 20 Drawing Sheets

(56)     References Cited

U.S. PATENT DOCUMENTS

| | | | |
|---|---|---|---|
| 2025/0104329 A1* | 3/2025 | Hoydis | G06T 15/06 |
| 2025/0192853 A1* | 6/2025 | Cho | H04B 7/0663 |
| 2025/0192855 A1* | 6/2025 | Cho | H04B 7/063 |
| 2025/0200283 A1* | 6/2025 | Wu | G06V 20/00 |
| 2025/0232506 A1* | 7/2025 | Yi | G06T 13/40 |
| 2025/0259388 A1* | 8/2025 | Lin | G06T 3/4038 |
| 2025/0327891 A1* | 10/2025 | Kalatzis | G01S 5/0252 |

OTHER PUBLICATIONS

Zhang H., et al., "An Artificial Intelligence Radio Propagation Model Based on Geographical Information", IEEE Transactions on Antennas and Propagation, IEEE, USA, Dec. 2022, vol. 70, No. 12, Oct. 24, 2022, pp. 12049-12060, XP011930711, p. 12049-p. 12059.

Brehmer J., et al., "Geometric Algebra Transformer", 37th Conference on Neural Information Processing Systems (NeurIPS 2023), arXiv:2305.18415v3 [cs.LG] Nov. 20, 2023, pp. 1-25.

* cited by examiner

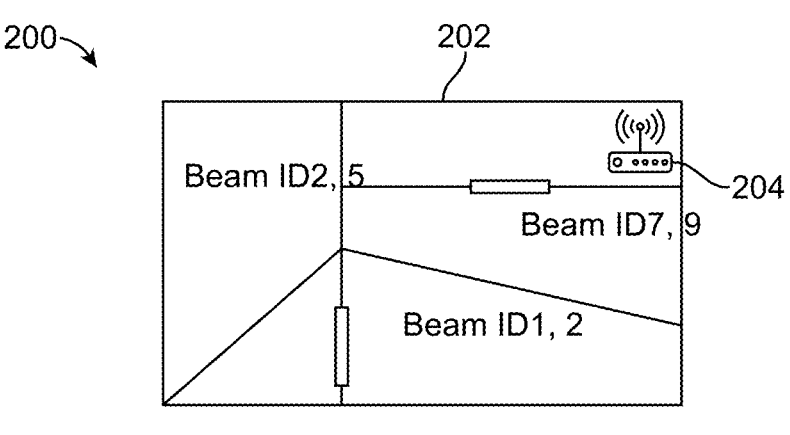
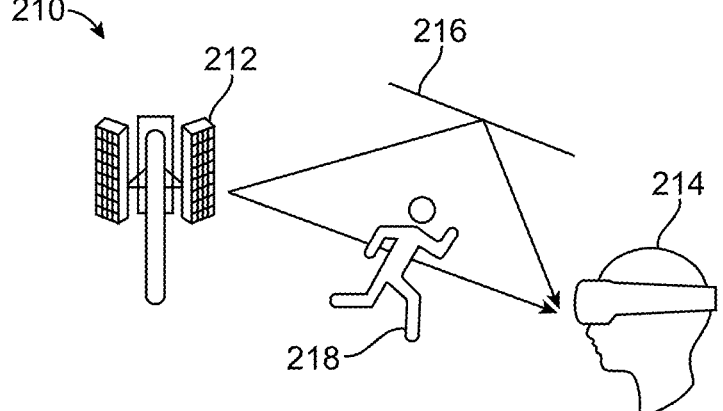
FIG. 2
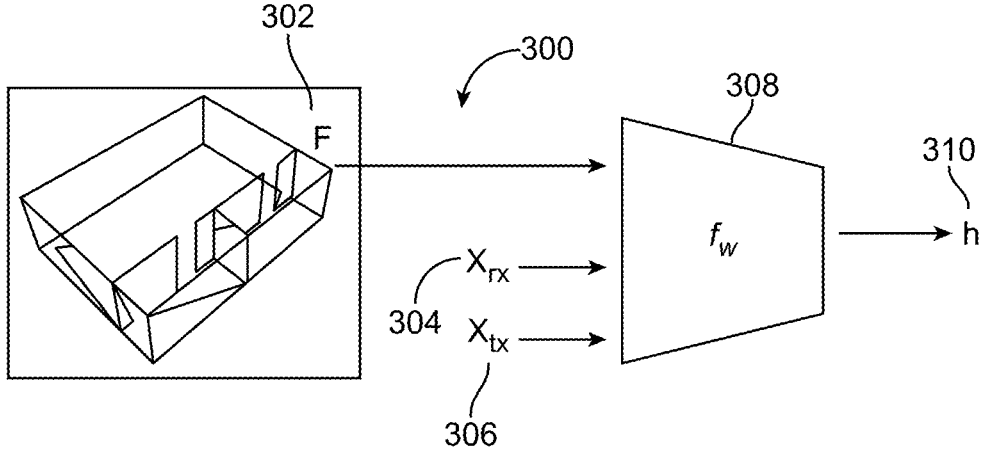
FIG. 3

400

402

404

406

SOTA Wireless Ray Tracing

Action puython

Agent

Simulator unity

Event

900

902    904

Transformer
(baseline)

Wireless GATr

2100

Encode, at a wireless geometric algebra tokenizer, one or more of three-dimensional scene data, a transmitter position, a receiver position and link information as a sequence of tokens which are geometric algebra representations ⟋2102

Process, at a neural network, the sequence of tokens to generate output comprising N geometric algebraic multivectors and M scalars to jointly model a relationship between the three-dimensional scene data, the transmitter position, the receiver position and wireless channels ⟋2104

FIG. 21

EQUIVARIANT SPATIALLY-CONSISTENT WIRELESS CHANNEL MODELS

TECHNICAL FIELD

The present disclosure generally relates to processing data using machine learning systems. For example, aspects of the present disclosure include systems and techniques for tokenizing data associated with three-dimensional room geometry, a transmitter position and a receiver position, and processing the data via a geometric algebra transformer (e.g., tailored for a three-dimensional space and equivariant with respect to symmetries of three-dimensional space). The output of the geometric algebra transformer can be used to predict link properties or signal strength at different locations within the three-dimensional room geometry and for other purposes.

BACKGROUND

Wireless signal propagation in a given environment is most accurately described by Maxwell's equations through the electro-magnetic (EM) fields. Solving these equations analytically is intractable for most non-trivial scenarios, and while numerical solutions are feasible at small scales, it is not practical for large scale environments. In the so-called far-field regime, macroscopic effects dominate the signal behavior. The shift has led to the emergence of geometric optics and the uniform theory of diffraction as essential tools for modeling wireless propagation. These foundational concepts underpin state-of-the-art ray tracing simulations, enabling accurate predictions of signal behavior in complex environments. Ray tracing has been a substantial tool in modeling the channel given an environment, yet for future applications, such as sensing, some model properties and speed of computation are lacking.

SUMMARY

Systems and techniques are described for providing an equivariant and spatially-consistent wireless channel model that uses a geometric algebra transformer. The geometric algebra transformer can be used as a general model that can be used to solve any problem with inputs and outputs that are geometric in nature. The geometric algebra transformer is agnostic as to the problem to be solved. The geometric algebra transformer may be trained to perform a single task or to perform more than one task. The geometric algebra transformer may act either on specific instructions regarding the task to be achieved or operate on another type of input according to its training.

The present disclosure introduces a new neural network or neural data-driven differentiable wireless channel model that can include a geometric algebra tokenizer and geometric algebra transformer (also called a geometric algebra backbone), which can be trained to provide accurate and fast wireless channel prediction. In some examples, the model can be used to predict a wireless channel between a transmitter (Tx) and a receiver (Rx) in a building environment or other environment in novel scenes not seen in training data. The model can jointly model relationships between the transmitter, the receiver, the three-dimensional scene and the channel between the transmitter and the receiver. The model can also enable inverse problems like completing a scene or identifying a position and/or orientation of a wall in a three-dimensional scene or inferring another physical feature of the scene. The model can also be used to predict a position of the transmitter and/or receiver or predict other characteristics of the transmitter and/or receiver. An extension of the model can be to use a diffusion model to predict distributions. Further, the model can be an equivariant wireless channel model meaning it can take advantage of symmetries within the three-dimensional space.

In some aspects, the techniques described herein relate to a processor-implemented method of processing data using a geometric algebra transformer, the processor-implemented method including: encoding, at a wireless geometric algebra tokenizer, one or more of three-dimensional scene data, a transmitter position, a receiver position and link information as a sequence of tokens which are geometric algebra representations; and processing, at a neural network, the sequence of tokens to generate output including N geometric algebraic multivectors and M scalars to jointly model a relationship between the three-dimensional scene data, the transmitter position, the receiver position and wireless channels.

In some aspects, the techniques described herein relate to an apparatus to predict link properties between a transmitter and a receiver in a three-dimensional space, the apparatus including: one or more processor; and a computer-readable medium storing instructions which, when executed by the one or more processor, cause the one or more processor to be configured to: receive a three-dimensional geometry, a transmitter position and a receiver position; and predict, based on a neural network wireless channel model, network link properties related to one or more channel between the transmitter position and the receiver position.

In some aspects, the techniques described herein relate to an apparatus to infer a scene property in a three-dimensional space, the apparatus including: one or more processor; and a computer-readable medium storing instructions which, when executed by the one or more processor, cause the one or more processor to be configured to: receive a three-dimensional geometry and a signal strength data associated with the three-dimensional geometry; and infer, based on the signal strength data and a neural network wireless channel model, a scene property related to the three-dimensional geometry.

In another aspect, a non-transitory computer-readable medium is disclosed. The transitory computer-readable medium has stored thereon instructions that, when executed by one or more processors, cause the one or more processors to perform operations according to any of the methods or processes disclosed herein.

In another aspect, an apparatus for processing data via a geometric algebra transformer is disclosed. The apparatus includes one or more means for performing any of the operations disclosed herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 2 is a diagram illustrating an example use case for beam management, according to aspects of the disclosure;

FIG. 3 illustrates an example of a handover and radio frequency front-end (RFFE) optimization, according to aspects of the disclosure;

FIG. 21 is a flow diagram illustrating method, according to aspects of the disclosure.

DETAILED DESCRIPTION

Figure 1:
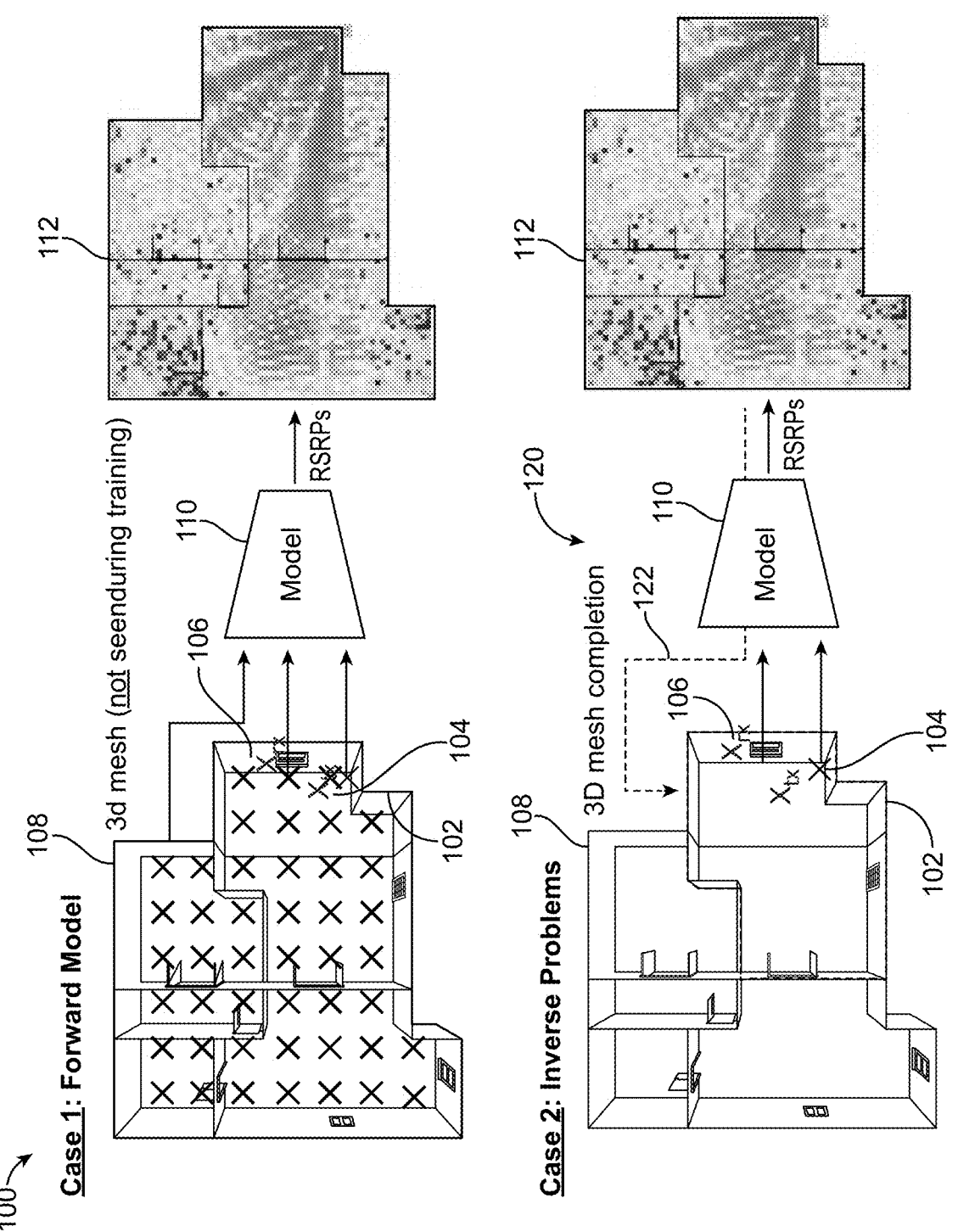
FIG. 1 is a diagram illustrating an example use of a geometric algebra transformer, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Geometric data is highly structured. For example, geometric data can be categorized into certain types, such as a three-dimensional coordinate of an object, a velocity vector, a weight of the object, etc. These geometric types of objects can inform a system of typical operations that can be performed with respect to the objects. However, traditional machine learning models are not configured to process such geometric data structures, which can lead to inefficiencies. For example, traditional machine learning models (e.g., neural network models) treat data as an unstructured vector of numbers, rather than geometric objects, require large amount of training data, and generalize poorly to new situations.

Another aspect of the highly structured nature of geometric data is that, when coordinate systems are changed (e.g., by moving the origin of a coordinate system to a new location), the numbers with which the data is represented can change, but the actual behavior of the system does not change, but the actual behavior of the system does not change. The fact that the behavior does not change is also reflected in how geometric data is structured. In robotics and other situations where a machine learning model (e.g., a neural network) learns behaviors or patterns from training data, it can be very beneficial to take the structure of geometric data into account. This can also apply to room structures in three-dimensional spaces.

It is also desirable for machine learning systems to be generalizable to situations outside of examples provided in training data. For example, a neural network can typically be trained for one type of situation (e.g., for classification, image segmentation, etc.). However, the neural network should also perform well when a new situation arises. Machine learning systems should also be efficiency with respect to data samples. For instance, when a neural network is trained on limited data (e.g., one hundred, five hundred, one thousand, or other number of training samples for the neural network model), the network should still perform well. Machine learning algorithms, including reinforcement learning algorithms, generally do not take into account the structure of geometric data, in which case they are often not able to generalize to new situations and are not sample efficient.

Systems, apparatuses, processes (also referred to as methods), and computer-readable media (collectively referred to as "systems and techniques") are described herein that provide a geometric algebra transformer (GATr) as part of a new neural network architecture that can be used to simulate wireless signals in three-dimensional spaces. The three-dimensional space will generally include physical features such as walls, doors, windows, furniture, wall material, and/or other characteristics. The three-dimensional space can include a transmitter (such as a WiFi router) and a receiver (such as a computer or mobile device). The disclosed approach provides a neural data-driven differentiable wireless channel model or an equivariant wireless channel model that utilizes a geometric transformer to enable fast channel prediction and can be used to jointly model the relationship between a transmitter, receiver and three-dimensional scene characteristics and the wireless channel between the transmitter and receiver. The equivariant wireless channel model can be used to infer data such as wall position and/or orientation, other scene characteristics, positions of the transmitter or receiver, and so forth.

A number of benefits can be realized using the disclosed approach. The model can be trained and used in inference when there is data scarcity. The model can also be used in the context of data type diversity where some data relates to three-dimensional scene characteristics and other data relates to channel characteristics. The model can be applied to a large scene with numerous rooms and can take advantage of symmetries given the equivariant nature of the model. The model can also handle inverse problems such as where the model can be used to predict a position or an orientation of a characteristic of the three-dimensional space, such as a location of a wall or piece of furniture, given the reference signal received power data at locations distributed through the three-dimensional space.

As noted above, an aspect of the neural network is equivariance which relates to the dynamics of systems that are the same everywhere in space and are independent of how coordinate systems are chosen. For example, whether the origin of a coordinate system is at one particular point or at another particular point or whether the X axis points in one direction or another direction, does not make any difference for how the system behaves. To incorporate this structure in the neural network, the network architecture is configured to be equivariant with respect to the symmetries of three-dimensional space regarding translations and rotations. In essence, equivariance means that if the system takes some input data and changes the coordinates, for instance by rotating it and translating it or by shifting the origin and the directions in which the axis point, then one can provide these inputs into the neural network and compute the outputs. Such an operation should result in the same output as if the system had processed the inputs without changing the coordinates. Alternatively, one could input the data into the network and then change the coordinates through translations and rotations of the outputs. The output would always be the same. Enforcing the condition for every component of the neural network guarantees that the network will exhibit the desired behaviors, namely that the network behavior is independent of coordinate system choices.

In one example, assume a transmitter is configured or positioned in one room of a four room building. Training could be done with knowledge of a first set of two rooms in the building that are symmetric to a second set of two rooms of the building. One training aspect could be to have one data point of the position of the transmitter on one of the first set of two rooms. The neural network is not trained on the configuration on the second set of two rooms, but there may be some geometric symmetry regarding the second set of two rooms that can be leveraged from the knowledge of the first set of two rooms. But using the principles disclosed herein, one can provide instructions for performing tasks that are a mirror image or rotated image of trained tasks. When the system enforces equivariance constraints, the network will be able to operate or performs tasks associated with the second set of two rooms even if it is never seen the particular example of the second set of two rooms in the data set. The disclosed architecture can enforce the equivariant constraint by introducing new types of network layer that will improve the efficiency with which the network learns from data, and it also improves how it generalizes to unseen situations. Such training taking advantage of symmetries can therefore be performed with sparce data which otherwise would not be possible.

Figure 11:
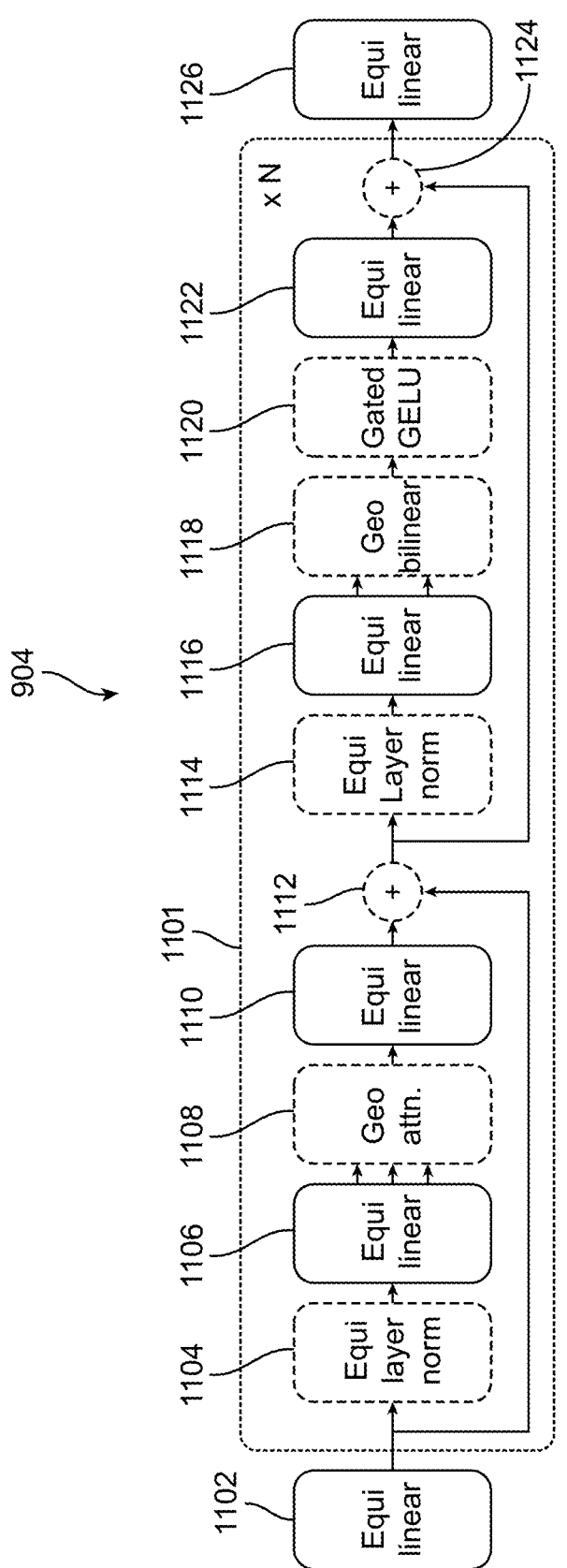
FIG. 11 is a diagram illustrating geometric algebra transformer architecture, according to aspects of the disclosure.

In general, a transformer is a deep learning model. A transformer typically performs self-attention (e.g., using at least one self-attention layer), differentially weighting the significance of each part of the input (which includes the recursive output) data. Transformers can be used in many contexts, including the fields of natural language processing (NLP) and computer vision (CV). Like recurrent neural networks (RNNs), transformers are designed to process sequential input data, such as natural language, with application to tasks such as translation and text summarization. However, unlike RNNs, transformers process the entire input all at once. The attention mechanism provides context for any position in the input sequence. For example, if the input data is a natural language sentence, the transformer does not have to process one word at a time. This allows for more parallelization than RNNs and therefore reduces training times. Compared to RNN models, transformers are more amenable to parallelization, allowing training on larger datasets. FIG. 11 illustrates the various components of a general transformer architecture.

The geometric algebra transformer described herein is based on processed data from a three-dimensional space or context that is prepared with geometric algebra representations. For example, the geometric algebra transformer can be designed for the geometric structure of the three-dimensional space (e.g., a building with various rooms) by processing the data and can be useful for applicants related to a wireless channel structure of a transmitter and a receiver within the building. The geometric algebra transformer can also be equivariant with respect to symmetries of the three-dimensional space. For instance, the geometric algebra transformer can be configured with multiple novel network layers that maintain E(3) equivariance. The term E(3) relates to the group of rotations, reflections and translations in three-dimensional space.

The geometric algebra transformer can be geometry dependent, symmetric, and can be used for sparce data collection scenarios and here can be applied to wireless channel modeling. Its characteristics as noted above include E(3) equivariance, natural geometry embedding, scalability and differentiable. The known wireless ray tracing approach relies on piece-wise planar representation of a three-dimensional environment or mesh. Transmitters and receivers are specified in that case by three-dimensional position plus three-dimensional orientation. These properties are naturally represented in geometric algebra. Thus, one can use geometric algebra transformer instead of ray tracing and can represent large-scale wireless propagation, such as in cities or streets, as well.

In general, this disclosure frames wireless channel modelling as a geometric problem. The approach herein introduces two new datasets with different degrees of complexity and a versatile backbone architecture: that can include a GATr with a wireless-specific tokenization scheme. There can be two algorithmic approaches that can include a predictive modelling approach (geometry→RSRP or reference signal received power) and a probabilistic modelling, which can be based on a diffusion model approach.

In general, there are three applications that includes RSRP prediction, receiver position or transmitter position inference, as well as other inferences related to a three-dimensional space, and geometry reconstruction (inferring non-line-of-sight geometry from wireless signals).

On aspect of this disclosure relates to differentiability for receiver versus transmitter inference. The inference task would not be possible with ray tracer technology. Further, geometry reconstruction of a three-dimensional space including other characteristics also would not be possible with ray tracer technology. The approach results in faster RSRP prediction than ray tracer technology and with a smaller loss in quality than with previous surrogates.

The disclosed approach introduces a new problem family with known properties (e.g., exact symmetries) and real-world impact. There are new and ready-to-use datasets/benchmarks which can be used for training. The disclosed approach innovates on existing models to provide models for mixed geometric data (mesh+points+links). Furthermore, there is an algorithm innovation in which inverse problems are cast as "inpainting".

In some aspects, the geometric algebra transformer can receive a multivector input, process the input using various layers or engines such as equilinear layers, normalization layers, a geometric attention layer, and geometric product engines to generate a multivector output. These are shown in FIG. 11. Data can be extracted from the multivector output and used to perform a task, such as predicting or inferring characteristics of the three-dimensional space given reference signal received power data or predicting a location of a transmitter or receiver in the three-dimensional space. There may be a plurality of values in a multivector (e.g., embedded into the multivector), where each value can represent a respective object (e.g., a geometric object, such as a scalar, a vector, a bivector, a trivector, a pseudoscalar, etc.) of a respective operator.

As noted above, the various applications of the geometric algebra transformer include robotics, molecular dynamics, astrophysics, among others. These various fields deal with geometric data, including points, directions, surfaces, orientations, etc. The geometric nature of data provides a rich structure that provides a notion of common operations between geometric types (computing distances between points, applying rotations to orientations), a well-defined behavior of data under transformations of a system, and the independence of certain properties of coordinate system choices.

When learning relations between geometric objects from data, incorporating this rich structure into the architecture has the potential to improve sample efficiency as well as generalization. Such strong inductive biases usually include two steps. First, many works categorize inputs, outputs, and internal data into certain object types, for instance group representations. Second, functional relations between different types have regularity constraints imposed, often based on equivariance constraints. This can be especially true when considering a model that simulates wireless signals or a wireless channel in the context of a three-dimensional space such as a building with rooms and doors, etc., that impact the propagation of signals from a transmitter to various parts of the three-dimensional space.

One illustrative example use of the geometric algebra transformer disclosed herein is for modeling wireless channels between transmitters and receivers in a three-dimensional space. For example, a simple task might be to train a model on two rooms in a three-dimensional space (that has five rooms) and obtain a reference signal received power (RSRP) map for the trained rooms. Then a three-dimensional mesh can be provided to the model which was not seen during training and the model can predict or infer the RSRP map for the additional rooms in the three-dimensional space.

The disclosed geometric algebra transformer can be trained to perform a task so that the transformer is E(3) equivariant and is agnostic as to the kind of training algorithm used or the kind of specific task or service for which the transformer is implemented. The geometric algebra transformer also includes internal representations that are particular for geometric three-dimensional data. As noted previously, the geometric algebra transformer is E(3) equivariant (e.g., equivariant with respect to the symmetries of three-dimensional space). Using the prior illustrative example of the three-dimensional space and rooms used for training, one could change the coordinate system of the three-dimensional space and the behavior of the wireless channel may stay the same in that it may be symmetric in the new space to what was trained in the known rooms of the space. The symmetry may be in the horizontal direction such as with room layout or may be in the vertical direction as well to model RSRP values or infer scene characteristics at a certain height in the scene.

In general, the approach disclosed herein is to jointly model a relationship between a transmitter, a receiver, a three-dimensional scene and a wireless channel or channels in order to perform a number of different tasks related to the three-dimensional scene.

In some aspects, a processor-implemented method of processing data using a geometric algebra transformer can include encoding, at a wireless geometric algebra tokenizer, one or more of three-dimensional scene data, a transmitter position, a receiver position and link information as a sequence of tokens which are geometric algebra representations; and processing, at a neural network, the sequence of tokens to generate output comprising N geometric algebraic multivectors and M scalars to jointly model a relationship between the three-dimensional scene data, the transmitter position, the receiver position and wireless channels. The neural network can include a geometric algebra transformer.

In some aspects, an apparatus is disclosed to predict link properties between a transmitter and a receiver in a three-dimensional space. The apparatus can include one or more processor; and a computer-readable medium storing instructions which, when executed by the one or more processor, cause the one or more processor to be configured to: receive a three-dimensional geometry, a transmitter position and a receiver position; and predict, based on a neural network wireless channel model, network link properties related to one or more channel between the transmitter position and the receiver position.

FIG. 1 is a diagram illustrating a summary of various models including a forward model 100 and an inverse problem model 120, according to aspects of the disclosure. In a first case, a forward model 100 can be described in which a first portion of a three-dimensional scene 102 is provided, including a transmitter location 104 and a receiver location 106, to a model 110. The model 110 can be a neural data-driven differentiable wireless channel model, an equivariant wireless channel model, or other model. The model 110, for example, can utilize a geometric algebra tokenizer and a geometric algebra transformer or GATr. The first case demonstrates how the model 110 can receive the first portion of the three-dimensional scene 102, the transmitter location 104 and the receiver location 106 for training. During inference, the model 110 can receive a second portion of the of the three-dimensional scene 108 and then can infer the RSRPs 112 for the entire scene. The approach can provide an accurate and fast channel prediction when given novel scenes and can provide rapid sample-efficient channel prediction or building.

Case 2 illustrates a inverse problem model 120 for a task of solving inverse problems where the first portion of the three-dimensional scene 102, the transmitter location 104 and the receiver location 106 are provided to the model 110 to generate the RSRPs 112. Then, the RSRPs 112 are provided to the model 110 to infer via an inference 122 some characteristic of the second portion of the three-dimensional scene 108. For example, the model 110 may infer a positioning or orientation of a wall, piece of furniture, door, window or any other aspect of the three-dimensional scene. The model 110 could also be given some data related to the three-dimensional scene, but not the transmitter location 104 and/or the receiver location 106. The RSRPs 112 can be used to predict the transmitter location 104 and/or the receiver location 106. Other characteristics of the three-dimensional scene can be inferred as part of solving an inverse problem.

FIG. 2 is a diagram illustrating an example use case for beam management 200. In one example, the model 110 can be used for millimeter wave beam management or other wavelengths. For example, the model 110 can be used to generate beam reports. As shown, a transmitter 204 can be positioned in a building 202 and various beam characteristics are shown for beam IDs 2, 5 in portion of the building, beam IDs 7, 9 in another portion of the building and beam IDs 1, 2, in another portion of the building. Walls and doors are shown in the building 202. Where the transmitter 204 uses beam forming or different beams rather than an omnidirectional transmission, the model 110 can be used to tailor specific beam reports which can be used for a variety of tasks such as those tasks disclosed herein but in the context of a beam forming transmitter configuration.

FIG. 2 also shows a future beam prediction approach 210 in which a transmitter 212 may transmit a signal and a person is moving 218 in a three dimensional space. A wall 216 is shown and a person with augmented reality (AR) glasses 214 is shown as well. The concept illustrated in the future beam prediction approach 210 involves taking into account movement of a transmitter and/or receiver where the RSRPs 112 for the three-dimensional scene may be changing based on some factor and the model 110 may be used to predict the wireless channel characteristics at a future time given expected movement of a transmitter and/or receiver in the three-dimensional space.

One example use case is sensing. FIG. 3 illustrates an example of a leveraging the model to address positioning and floor map reconstruction 300. Sensing can involve leveraging a differentiable channel model such as model 110. Here, the model fx 308 is shown that can a version of the model 110 and can be used to simultaneously address positioning and flop map reconstruction. Positioning of a receiver $(x_{rx})$ or $X_{rx}$ 304 based on an observed scene $(h_{obs})$ or $h_{obs}$ 310 and transmitter position $(x_{tx})$ or $X_{tx}$ 306 can be modeled as follows:

$$h_{obs} \rightarrow x_{rx}$$

$$\operatorname*{argmin}_{x_{rx}} \mathcal{L}(f_w(x_{rx}, x_{tx}, F), h_{obs})$$

$$x_{rx} \leftarrow x_{rx} - \eta \frac{\partial \mathcal{L}(f_w(x_{rx}, x_{tx}, F), h_{obs})}{\partial x_{rx}}$$

The value (F) represents a floor map 302 reconstruction can be performed based on the position of the receiver $(x_{rx})$ or $X_{Rx}$ 304 as follows:

$$h_{obs} \rightarrow F$$

$$\operatorname*{argmin}_{F} \mathcal{L}(f_w(x_{rx}, x_{tx}, F), h_{obs})$$

$$F \leftarrow x_{rx} - \eta \frac{\partial \mathcal{L}(f_w(x_{rx}, x_{tx}, F), h_{obs})}{\partial F}$$

Another aspect of this disclosure is handover and radio frequency front-end (RFFE) optimization. With RFFE and handover optimization, it is important to know sharp changes in RSRPs (e.g., such as when entering/exiting a tunnel) to optimize communication e.g., handover parameters. Thus, as a vehicle approaches a tunnel, there will be a sharp change in RSRPs experienced by a mobile phone in the vehicle and those sharp changes can be used in the model 110 to predict future RSRP in the tunnel or outside the tunnel. In general, wherever there is a sharp change in RSRPs, the model 110 can be trained to predict future RSRPs in the new three-dimensional space and such information can be used to determine handovers. Such changes can occur with a transition to a tunnel or a garage, a large vehicle next such as a truck traveling next to a vehicle, weather changes (a quick forming storm), and so forth. Any scenario of a change in RSRP can be applied to the model 110.

Figure 4:
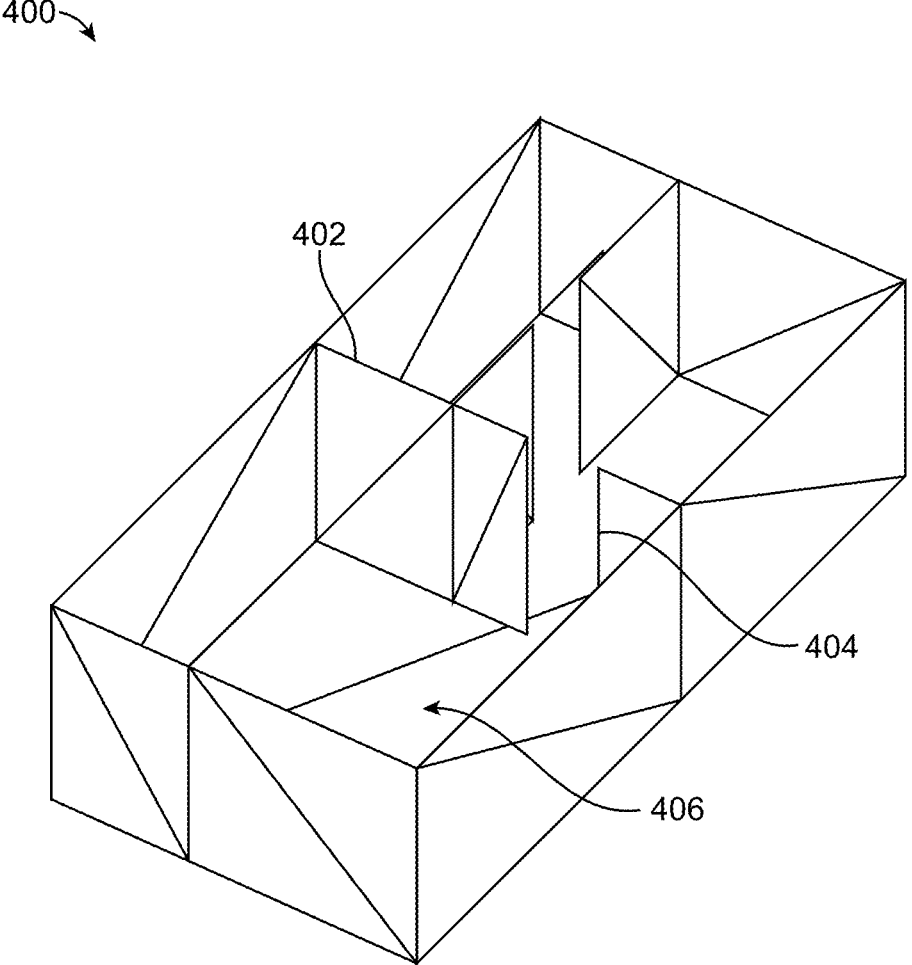
FIG. 4 is a diagram illustrating three-dimensional room dataset, according to aspects of the disclosure.

FIG. 4 is a diagram illustrating a three-dimensional dataset room 400 showing how to use a three-dimensional room dataset, according to aspects of the disclosure. A new dataset is introduced which can be called a Wireless Insite Wireless Threerooms Dataset (WiWi3Rooms). The WiWi3Room Dataset is new compared to the known WiNeRT threerooms dataset. The new dataset includes variation in z-value meaning that it includes a height component where the RSRPs 112 can be represented based on a z-value or height in a room. The three-dimensional dataset room 400 includes walls 402, doors 404 and different rooms 406. The new dataset uses Wireless InSite instead of PyLayers simulations as in other datasets.

In one example, the new dataset includes give transmitter locations, two hundred receiver locations, and five thousand rooms and provides the following formula: $x \sim \mathcal{U}(0.35, x_{max}-0.35)$, same for y, z both the transmitter Tx and the receiver Rx.

The new dataset uses three reflections, one transmission and one diffraction with a vertically polarized isotropic antenna and it keeps the twenty-five strongest paths. The new dataset stores raw path information including gain, phase, delay, AOA (angle of arrival), AOD (angle of departure), DOD (direction of departure), DOA (direction of arrival) and can compute channel in post-processing such as CIR/CFR (or channel impulse response/channel frequency response), and antenna patterns. The approach combines GATr with wireless channel concepts and provides the use of a non-coherent infinite-band RSRP and a vertically polarized omnidirectional antenna. A dataset could also be developed for a non-omnidirectional antenna where one performs beam-forming with certain characteristics. The dataset can be stored in a computer-readable storage medium and may be considered a separate example which can be claimed in the present application.

Figure 5:
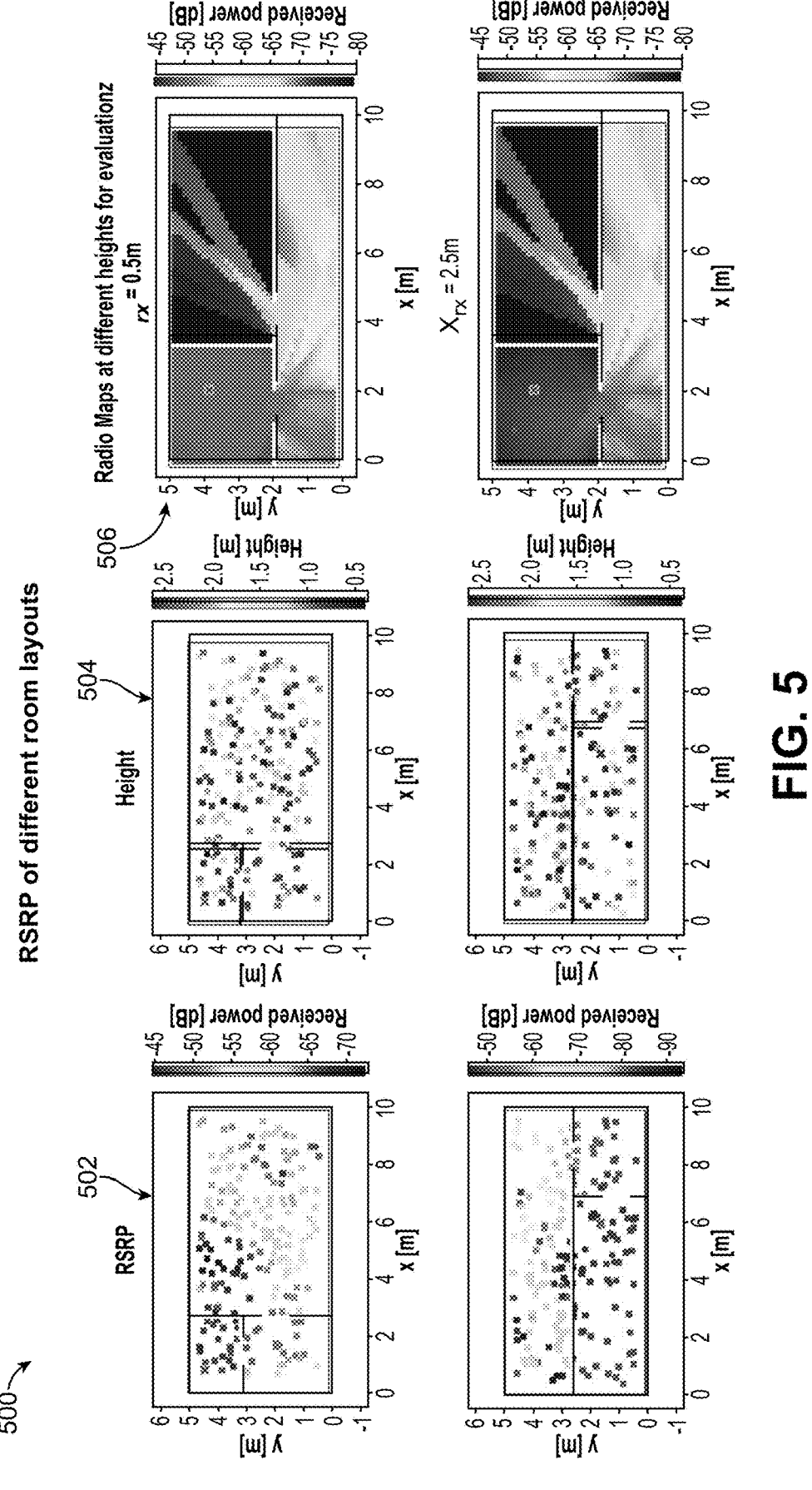
FIG. 5 is a diagram illustrating an example of a mapping of reference signal received power for a room layout, according to aspects of the disclosure.

FIG. 5 is a diagram illustrating an example of a mapping of reference signal received power for a room layout 500, according to aspects of the disclosure. As shown a first set of RSRPs 502 is illustrates for positions within two different room configurations. The height data 504 is shown for the RSRP mappings at different heights within the different room configurations. The radio maps 506 are shown for a first height $z_{rx}$ of 0.5 meters and a second height $z_{rx}$ at 2.5 meters. FIG. 5 therefore illustrates the use of data at different z values within a three-dimensional scene.

Figure 6:
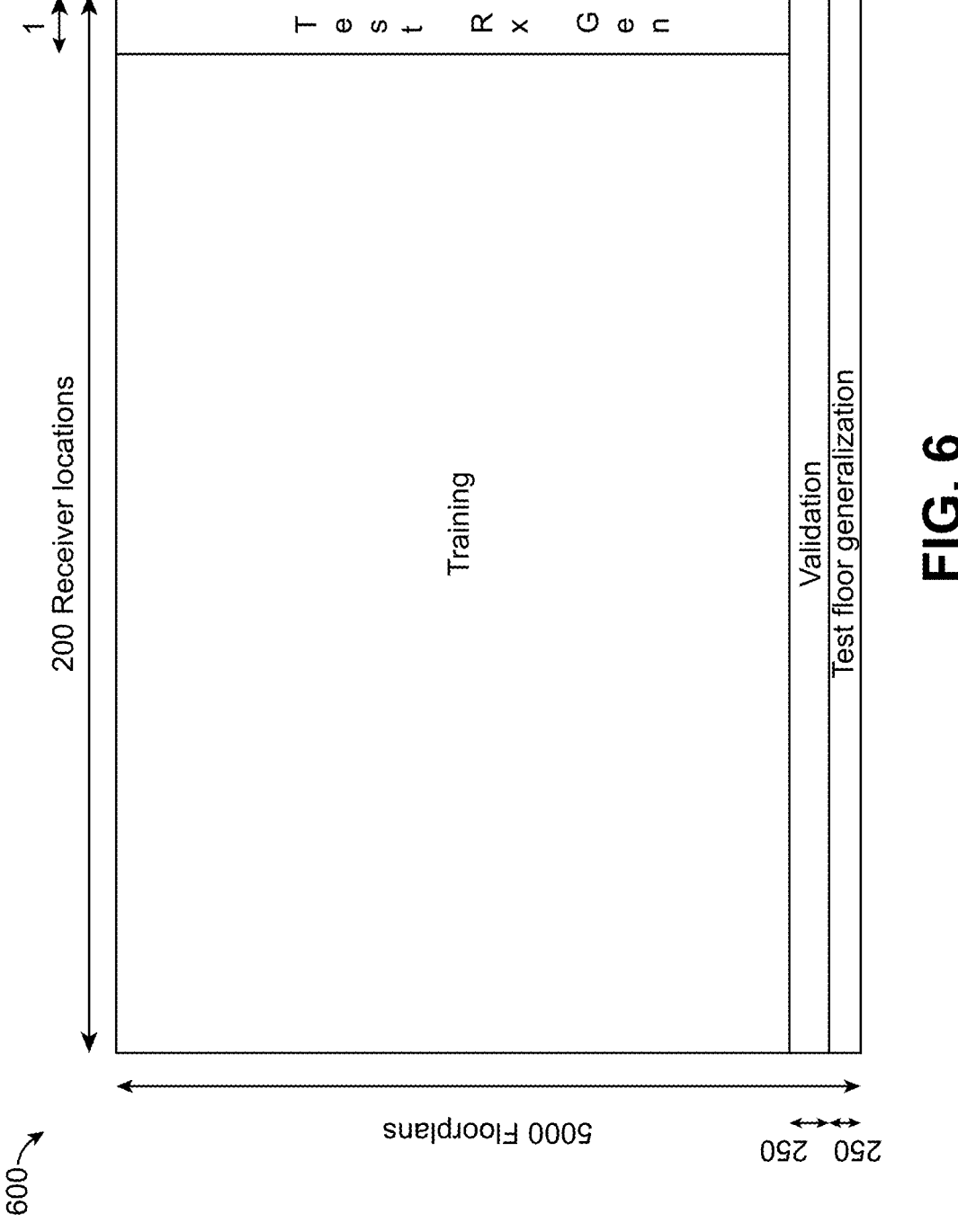
FIG. 6 is a diagram illustrating an example of dataset splits, according to aspects of the disclosure.

FIG. 6 is a diagram illustrating an example of dataset splits 600, according to aspects of the disclosure. The dataset splits are shown to evaluate generation of new three-dimensional receiver locations and also to evaluate a generalization to new environments. The training data, validation data, test floor generalization and test receiver generation data are shown for two hundred receiver locations and five thousand floor plans.

Figure 7:
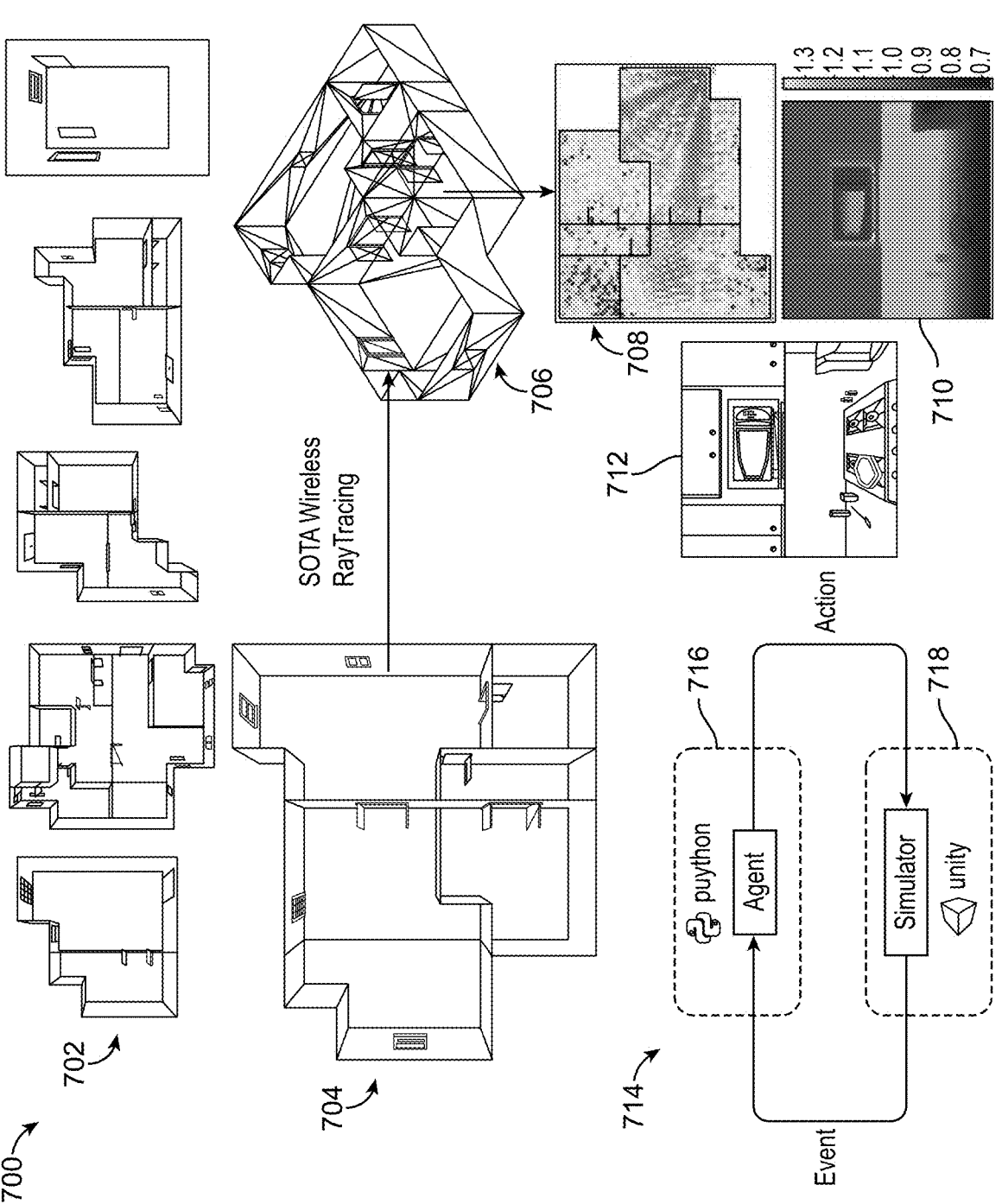
FIG. 7 is a diagram illustrating three-dimensional room dataset ProcTHOR, according to aspects of the disclosure.

FIG. 7 is a diagram illustrating three-dimensional room dataset ProcTHOR 700. Massive datasets and high-capacity models have driven many recent advancements in computer vision and natural language understanding. ProcTHOR is a known dataset that is a framework for procedural generation of Embodied AI environments. ProcTHOR enables users to sample arbitrarily large datasets of diverse, interactive, customizable, and performant virtual environments to train and evaluate embodied agents across navigation, interaction, and manipulation tasks. ProcTHOR includes samples of 10,000 generated houses and a simple neural model. Models trained using only RGB (red-green-blue) images on ProcTHOR, with no explicit mapping and no human task supervision produce state-of-the-art results across six embodied AI benchmarks for navigation, rearrangement, and arm manipulation. The ProcTHOR dataset includes geometry diversity by providing rooms with diverse shapes. Rooms 702 illustrates some of the various scenes that are available, which can result in scene diversity. The ProcTHOR dataset includes radio frequency (RF) material diversity by providing wall or other components made from different materials such as five different materials. These different materials will have different electromagnetic signal propagation interactive properties. The ProcTHOR dataset is also correlated with object types: e.g., wooden doors, glass windows, and so forth.

A room layout 704 can be obtained from the ProcTHOR dataset. The ProcTHOR dataset is a large-scale dataset with respect to three-dimensional (3D) geometry for the room layout 704, such as the geometry/mesh 706. The geometry/mesh 706 can include data associated with materials (e.g., sheet rock on walls, carpet on floors, etc.). According to the systems and techniques described herein, ray tracing can be performed on the geometry/mesh 706 to generate wireless data, including data for wireless channels, path features, etc. Simulated channels can be obtained, from which the RSRP 708 can be computed. In FIG. 7, a first diagram 710 and a second diagram 712 represent data associated with interior features such as a stove and a microwave in a kitchen. The RSRP 708, the first diagram 710, and the second diagram 712 can be used to represent a simulated sensor response in an embodied AI framework 714. They systems and techniques described herein can be used to extend the original ProcTHOR data to a wireless modality context.

As noted previously, the ProcTHOR dataset can be used for embodied AI framework 714 that can include existing sensors (e.g., RGBD), such as an agent using python 708, and can enable control problems such as an agent controlled using a Unity game engine. An agent 716 can choose to perform an action in an environment. In some examples, the action can include moving an item, introducing a new item, turning on a light, any combination thereof, and/or other action. The simulator 718 can simulate the environment given the action. The change in the environment due to the action can then trigger the agent 716 to react with another action, and so forth. The addition to the AI framework 714 can include the simulator being enabled to include the change in the wireless signal given the action of the agent.

Figure 8:
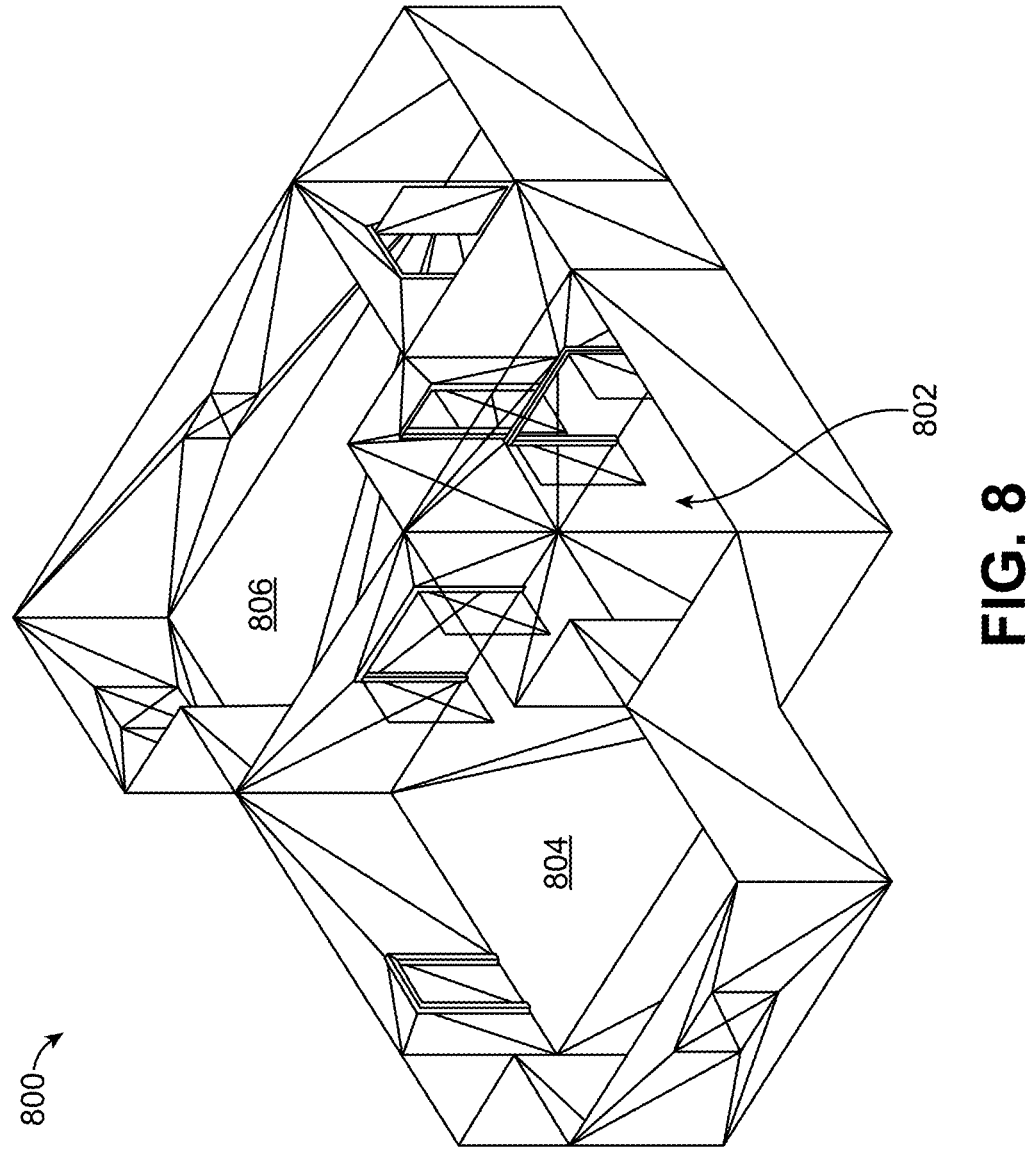
FIG. 8 is a diagram illustrating three-dimensional room dataset ProcTHOR and its use and how it structures its data, according to aspects of the disclosure.

FIG. 8 is a diagram illustrating the use of a three-dimensional room dataset ProcTHOR 800, according to aspects of the disclosure. Based on ProcTHOR room layouts, there are 10,000 trained scenes plus one thousand valuation and one thousand test scenes. There are approximately twenty days simulation time (five simulations in parallel). The scene includes 1-15 transmitter locations, up to two hundred receiver locations. There are x, y locations based on reachable positions, z values with $z\sim\mathcal{U}(0.2, 2.5-0.2)$.

The use of the three-dimensional room dataset ProcTHOR 800 includes a first room 802, a second room 804 and a third room 806. The dataset includes six reflections, three transmissions, and one diffraction set of data. The antenna used is a vertically polarized Isotropic antenna and the twenty-five strongest paths are used. The materials used in the use of the three-dimensional room dataset ProcTHOR 800 include one or more of concrete, glass, wood, ceiling board, floorboard, and drywall. Other materials such as paint type, furniture, carpet or rug data, nails, screws, light fixtures and so forth can be used as well. The ProcTHOR dataset stores raw path information and can include gain, phase, delay, AOA, AOD, DOD, and DOA. The approach can include computing wireless channels in post-processing (e.g., CIR/CFR, Antenna patterns) and can combine as disclosed herein a GATr with wireless data such as non-coherent infinite-band RSRP and the use of a vertically polarized omnidirectional antenna, or a beam-forming approach.

Figure 9:
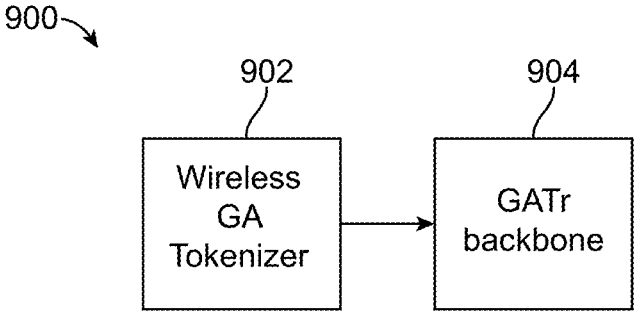
FIG. 9 is a diagram illustrating an example a neural data-driven differentiable wireless channel model, according to aspects of the disclosure.

FIG. 9 illustrates an architecture overview of a multi-component model 900 that includes a first component 902 which can be a wireless geometric algebra (GA) tokenizer that encodes a three-dimensional scene, one or more transmitter position, one or more receiver position, and link or wireless channel information as a sequence of tokens. A second component 904 can be a GATr such as a GATr backend or GATr backbone that is a versatile neural network architecture that operates on the tokens output by the GA tokenizer or first component 902.

As described herein, the second component 904 or GATr can be a general-purpose network architecture for geometric data. Raw input data can be received from any three-dimensional context such as an image, a scene, a building layout, transmitter positions, receiver positions, a point cloud, a video, and/or other data related to a task in three-dimensions. A pre-processing engine (which can be the first component 902) can processes the data to generate geometric types. The pre-processing may or may not be necessary depending on the structure of the raw inputs. In one illustrative example, the pre-processing engine or first component 902 can parse pixels of images from one or more cameras into positions and/or velocities of one or more objects in the images. Additionally or alternatively, in another illustrative example, the pre-processing engine can process locations of objects, orientation of objects, and/or a direction of movement of objects in a three-dimensional space.

A geometric algebra embedding engine (which can be part of the first component 902) can generate multivector inputs (also referred to as multivectors) using the geometric types. For example, the geometric algebra embedding engine can embed the geometric types (e.g., the geometric properties of the input data) into multivector representations of the multivector inputs. In one illustrative example, the multivector inputs can be generated from a geometric product of vectors.

Additionally or alternatively, in another illustrative example, the multivector inputs can be a representation of geometric objects and operators associated with the geometric objects. In some aspects, the geometric algebra embedding engine can embed the geometric objects into multivectors of geometric algebra $\mathbb{G}_{3,0,1}$, which can result in the multivector inputs.

The first component 902 can receive as inputs any combination of a three-dimensional geometry of a scene, a transmitter position, a receiver position and a transmitter-receiver link with associated information such as RSRP, signal strength, phase, and so forth. The output of the first component 902 can be a sequence of tokens in which each token includes n geometric algebra multivectors and m plain numbers ("scalars"). Table 1 illustrates the type of data, the tokenization process and the information associated with each token.

TABLE 1

| Type | Tokenization | Information |
| --- | --- | --- |
| 3D environment | One token per mesh face (triangle) | Mesh face center position<br>Vertex positions<br>Relative vertex positions from center<br>Mesh face plane and normal vector<br>Material properties (if available) |
| Tx | One token per Tx | Tx position<br>Antenna orientation |
| Rx | One token per Rx | Rx position<br>Antenna orientation |
| Tx-Rx link | One token per Tx-Rx link | RSRP (signal strength)<br>Phase (if relevant)<br>Delay (if relevant) |

The second component 904 or GATr can receive the multivector inputs from the first component 902. Based on performing equivariant processing of the geometric algebra representations embodied in the multivector inputs, the second component 904 or GATr can generate multivector outputs. An extraction engine (not shown) can extract geometric objects (e.g., based on geometric algebra) from the multivector outputs to obtain a final output. The final output can be used to perform a task, such as to predict or infer a wall location or a position of a transmitter or receiver in a three-dimensional scene.

The design of second component 904 or GATr follows from three main objectives. First, an objective is to naturally represent both geometric objects and their transformations, The second component 904 or GATr represents data as multivectors of the projective geometric algebra $\mathbb{G}_{3,0,1}$. In some aspects, the algebra is an extension of the vector space $\mathbb{R}^3$ to 16 dimensions, can uniquely represent various geometric types, and can describe common interactions between them using a single operation, the geometric product. Note that while one example of the multivector or multivector input is one with sixteen dimensions, a multivector can be constructed within the scope of this disclosure with other dimensions greater than or less than sixteen.

Another object of second component 904 or GATr is to behave in a well-defined way under active and passive transformations. The second component 904 or GATr in this regard is equivariant with respect to E(3), the symmetry group of the three-dimensional space. This is achieved through several new E(3)-equivariant layers between multivectors. The second component 904 or GATr also allows for flexibility with respect to object and time dimensions, as well as for efficient training. In one aspect, the second component 904 or GATr is organized as an (axial) transformer. For example, the second component 904 or GATr can enable processing with respect to an object and a time dimension such as would be relevant in a video or series of images.

In one aspect, the second component 904 or GATr combines two lines of research: the representation of geometric objects with geometric algebra and the encoding of symmetries through equivariant deep learning. Further, the second component 904 or GATr also incorporates or address the modeling of wireless channels. The combination enables a versatile architecture for any problem with geometric data. The second component 904 or GATr can operate in diverse problems from three different fields: by predicting astrophysical trajectories, as the backbone of a diffusion model used for robotic planning, and to learn forces in molecular dynamics. The primary task disclosed herein relates to the use of modeling the relationship between three-dimensional scene characteristics, a transmitter location, a receiver location and link information or wireless channel characteristics. Another task can relate to movement of an object such as a vehicle or mobile device (as a transmitter and/or receiver) within a three-dimensional scene relative to physical characteristics of a scene to map or model RSRP abrupt changes for various tasks.

Geometric algebra is an elegant, versatile and practical mathematical framework for geometrical computations. Whereas a plain vector space allows one to take linear combinations of elements (vectors), a geometric algebra additionally has a bilinear associative operation (the geometric product, denoted simply by xy) that allows one to compose any two elements of the algebra to get a third. Taking products of vectors, one obtains so-called multivectors, which can represent both geometrical objects (linear subspaces) and operators (rotations and reflections). Just like vectors, multivectors have a notion of direction as well as magnitude and orientation and can be linearly combined. In addition to playing a role as constructor of objects and operators, the geometric product is also used in a simple formula that can be used to apply any kind of operator to any kind of object or operator.

The following is an overview of geometric algebra (GA). Multivectors can be expanded in terms of basis multivectors, which are geometric products of basis vectors. In a 3D GA with orthogonal basis $e_1$, $e_2$, $e_3$, a general multivector takes the form:

$$x = x_s + x_1 e_1 + x_2 e_2 + x_3 e_3 + x_{12} e_1 e_2 + x_{13} e_1 e_3 + x_{23} e_2 e_3 + x_{123} e_1 e_2 e_3, \quad (1)$$

real coefficients $x_*$. Thus, one is allowed to add elements of different dimensionality (grade), such as scalars (grade 0), dimensional vectors (grade 1), bivectors (grade 2), all the way up to the pseudoscalar $e_1 \ldots e_d$ (grade d). In terms of coefficient vectors, this addition means stacking the coefficients like $(x_s, x_1 \ldots, x_{1 \ldots d})$; multivector addition is then done elementwise.

The geometric product is characterized by the fundamental equation $vv = \langle v, v \rangle$, where $\langle \bullet, \bullet \rangle \mathcal{U}$ is an inner product. In order words, the system requires that the square of a vector is its squared norm. In an orthogonal basis, where $\langle e_i, e_j \rangle = \delta_{ij} \in_i$ for some $\in_i$, one can derive that the geometric product of basis vectors is antisymmetric: $e_i e_j = -e_j e_i$. Since reordering only produces a sign flip, the system only gets one basis multivector per unordered subset of basis vectors, and so the total dimensionality of a GA is $$\sum\nolimits_{i=0}^{d}\binom{d}{k}=2^{d}.$$

Moreover, using antisymmetry, bilinearity, and the fundamental equation, one can compute the geometric product of arbitrary multivectors, such as: $(e_3+e_2)$ $(e_1e_2+3e_3)=e_3e_1e_2+3e_3e_3+e_2e_1e_2+3e_2e_3=3\in_3-\in_2e_1+3e_2e_3+e_1e_2e_3$.

Using the geometric product, one can construct various kinds of objects and operators. For example, given vectors v, w the bivector $v\wedge w\equiv(vw-wv)/2$ represents the plane element in the subspace spanned by v and w. The sign of the bivector represents the orientation of the plane element, and its magnitude is the area of the parallelogram spanned by v and w. One can also interpret a vector n as an operator that reflects other objects in the hyperplane with normal vector n. Operators can be composed using the geometric product, for instance producing a rotation operator R=nm from two reflections.

Next the principles of equivariance are discussed. E(3) and the Pin (p, 1, r) group actions. In one example, the representations can be achieved in $\mathbb{G}_{3,0,1}$ multivectors. The following is an example in equation (2) of a Pin action on multivectors:

$$\rho_u(x)=(-1)^{grade(u)\,grade(x)}u\circ x\circ u^{-1} \qquad (2)$$

In one example, the second component 904 or GATr can be based on a number of objectives, which together motivate its architecture. One object can relate to providing geometric inductive bias through geometric algebra representations. The second component 904 or GATr can be designed to provide strong inductive biases for geometric data. The network should be able to represent different geometric objects and their transformations, for instance points, lines, planes, translations, rotations, and so on. In addition, the second component 904 or GATr should be able to represent common patterns with few layers and be able to identify such patterns from little data. Examples of such common patterns include computing the relative distances between points, moving objects along directions or computing the intersections of planes and lines.

The use of geometric algebra provides a language that is well-suited to this task. In particular, the projective geometric algebra $\mathbb{G}_{3,0,1}$ structure is used and use the plane-based representation of geometric structure outlined above.

Another objective can relate to symmetry awareness through E(3) equivariance. The disclosed architecture for the second component 904 or GATr can respect the symmetries of a three-dimensional space. On the one hand, this makes any computation independent of arbitrary choices of coordinate system (passive symmetries), and on the other hand, it reflects that the fundamental dynamics of the system should not change if one moves the system to a different location or orientation (active symmetries). The second component 904 or GATr is configured to be equivariant with respect to the symmetry group E(3) of translations, rotations, and reflections. By using representations based on the projective geometric algebra $\mathbb{G}_{3,0,1}$, the system can ensure "proper" E(3) equivariance, including with respect to translations of the inputs. In other words, there is no need to manually canonicalize the input, for instance by translating the system to shift the center-of-mass system to the origin.

Note that many systems will not exhibit the full E(3) symmetry group. The direction of gravity, for instance, often breaks it down to the smaller E(2) group. To maximize the versatility of second component 904 or GATr, a E(3)-equivariant architecture is proposed to include symmetry-breaking effects as part of the network inputs.

Another objective can relate to providing flexibility and expressiveness through axial attention. The second component 904 or GATr can be as flexible as possible. It is suited to map between a variable number of objects and be able to describe static systems as well as time series. At the same time, the second component 904 or GATr is expressive. To achieve these objectives, one aspect of the second component 904 or GATr is that it is implemented as a transformer, based on attention over multiple objects (similar to tokens in multilayer perceptron (MLP) or image patches in computer vision). When describing dynamic data, the architecture is extended to an axial transformer, with alternating blocks that attend over objects and over time steps. Time steps are encoded using rotary position embeddings.

The disclosed architecture as noted above is flexible and efficient. The architecture is also scalable, which is well-suited to be built as a transformer.

Equivariance can also refer to permutation equivariance and time translation equivariance. Another aspect is expressivity. Since there is both equivariant linear maps and geometric products in the architecture, a sufficiently deep network can learn sandwich products as in Eq. (2), and thus the group action layers, with data-dependent group actions and an equivariance constraint.

Figure 10:
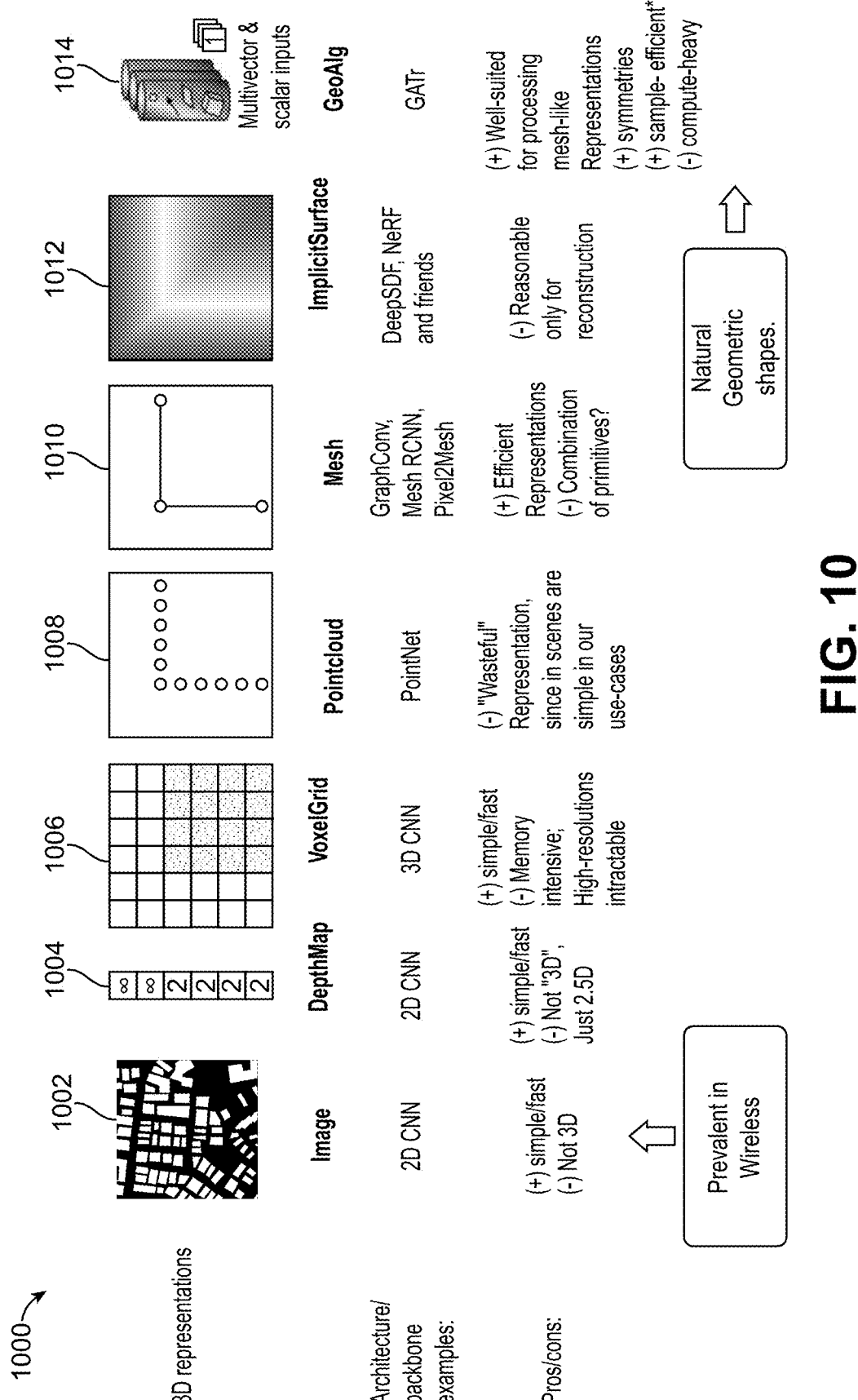
FIG. 10 is a diagram illustrating a comparison of three-dimensional representations or backbones, according to aspects of the disclosure.

FIG. 10 illustrates a comparison 1000 of three-dimensional representations or backbones. A first comparison includes a three-dimensional representation of the three-dimensional scene 1002 which is used in a two-dimensional CNN. A depth map 1004 is a three-dimensional representation as well and can be used in a two-dimensional CNN. A voxel grid 1006 is a three-dimensional representation that can be used in a three-dimensional CNN. A pointcloud 1008 can be used in a PointNet. A mesh three-dimensional representation 1010 can be used in tools like GraphConv, Mesh RCNN (region-based convolutional neural network), Pixel2Mesh. An implicate surface three-dimensional representation 1012 is used by such tools as DeepSDF (Deep Signal Distance Function), NeRF (Neural Radio Frequency), and so forth. The geometric algebra three-dimensional representation 1014 is used in the GATr architecture and has the benefit of being well-suited for processing mesh-like representations and is example efficient and can process natural geometric shapes. The pros and cons of each of these representations is shown in FIG. 10.

FIG. 11. illustrates more details about the second component 904 or GATr. A first equilinear layer 1102 provides input to the second component 904 or GATr. The second component 904 or GATr can be represented as a transformer block 1101 of which there can be N versions of the transformer block 1101. The second component 904 or GATr can include one or more of a first normalization layer 1104, a second equilinear layer 1106, a geometric attention layer 1108, a third equilinear layer 1110, a first addition component 1112, a second normalization layer 1114, a fourth equilinear layer 1116, a geometric bilinear layer 1118, the scalar-gated Gaussian Error Linear Units (GeLU) nonlinearity layer or GeLU nonlinearity layer 1120, a fifth equi-linear layer 1122, a second addition component 1124 and a sixth equilinear layer 1126.

The first normalization layer 1104 and/or the second normalization layer 1114 can perform layer normalization as follows. In one illustrative example, an E(3)-equivariant LayerNorm operation for multivectors can be defined as follows in the equation:

$$LayerNorm(x) = \frac{x}{\sqrt{\mathbb{E}_c \langle x, x \rangle}},$$

where the expectation goes over channels and the inner product $\langle \bullet, \bullet \rangle$ of the geometric algebra can be used. The respective normalization layer can be an equivariant layer in the operation, which means that the layer receives multivector inputs and rescales the inputs in which for each element of the batch and for each other dimension the layer sums over all the channels and computes $X^2$ where $X^2$ is computed using a particular property of the geometric algebra—the inner product. It is comparable to a length of a multivector squared. Then the layer takes the square root of this value and rescales X which ensures that the data is normalized to channels that that have an average length of one. In general, the respective normalization layer rescales the inputs such that the numbers are not extremely low or extremely high.

The scalar-gated Gaussian Error Linear Units (GeLU) nonlinearity layer or GeLU nonlinearity layer 1120 can be implemented as a scalar-gated GeLU nonlinearities according to the equation:

$$GatedGeLU(x) = GeLU(x_1)x,$$

where $x_1$ is the scalar component of the multivector x. The scalar-gated nonlinearity layer can include a scalar-gated Gaussian Error Linear Units (GeLU) nonlinearity layer.

The geometric attention layer 1108 is also provided as part of the second component 904 or GATr. The object of the geometric attention layer 1108 is generally to combine different objects or different time steps behind the multilayer perceptron to combine different channels within the same objects or time steps. Given multivector-valued query, key, and value tensors, each including $n_i$ items (or tokens) and $n_c$ channels (key length), the system can define the E(3)-equivariant multivector attention as the following equation:

$$Attention\ (q, k, v)_{i'c'} = \sum_i Softmax_i \left( \frac{\sum_c \langle q_{i'c}, k_{ic} \rangle}{\sqrt{8n_c}} \right) v_{ic'}.$$

Here, the indices i, i' label items, c, c' label channels, and $\langle \bullet, \bullet \rangle$ is the inner product of the geometric algebra. Just as in a vanilla attention mechanism, the geometric attention layer 1108 can compute scalar attention weights with a scaled dot product. The difference is that the dot product subsumes the geometric algebra inner product.

In some cases, the multivectors can describe a multiplicity of data, such as multiple objects or multiple time steps to interact with each other in some way. The system cannot have a linear layer that allows every object or time step to relate to or communicate with everything else because of the expense of such a process. To address such an issue, the geometric attention layer 1108 is provided. A standard attention layer is extended to enable it to process multivector data and also to be equivariant. The geometric attention layer 1108 assumes that there is not just one multivector input but three queries, keys and values, Q, K and V. Each of them has an item index or token index written as "I" in the equation above. The "I" value in this case is not the multivector component, but it can relate to the labels associated with an object such as a transmitter or receiver in a location in a room for example. The "I" value could label the time step in a sequence either of these things. It could also be combination of the two, so each of the three input values—the queries, keys and values—has an item dimension and it has a channel dimension. There is also a multivector dimension with the 16 components that is not shown explicitly in the equation. The output of the geometric attention layer 1108 can be defined as computing the inner product between queries and keys or the multi vector dimension of the channel dimension divided by a normalizing factor which can be a square root of the number of channels. Then the geometric attention layer 1108 computes using a factor 8 computing of a SoftMax calculation over the input dimension and performs a matrix multiplication with the values.

For each query, the geometric attention layer 1108 seeks to find the matching values by computing the product of the query with the keys that corresponds to the values. The data is expressed as queries, keys, and values and the geometric attention layer 1108 computes the inner product of queries and keys and normalizes this using SoftMax and then computes the matrix multiplication with the values.

The system needs these three inputs: queries, keys and values. Usually in the neural network there is one data tensor or one multivector tensor X. The geometric attention layer 1108 is extended more as shown in the above equation to define multi-head self-attention (MHSA) which is basically receiving the input tensor X and using three different linear operations to compute the queries, the keys and the values from the input data. The system feeds these into the geometric attention layer 1108. The geometric attention layer 1108 can be called multihead attention because there is not just one version of this, it can be repeated say, for example, four times. The system concatenates the four outputs along the channels.

The second component 904 or GATr introduces a versatile network architecture for geometric data and can use geometric representations and a geometric algebra multivector plus scalar tokens as output by wireless GA tokenizer or first component 902. The second component 904 or GATr respects symmetries of wireless signal propagation through equivariance properties as well as rotations, translations and mirrorings (E(3)) and can operate on permutations of tokens.

In another aspect, the second equilinear layer 1106, the geometric attention layer 1108, the third equilinear layer 1110, the fourth equilinear layer 1116 and the fifth equilinear layer 1122 can each be learnable components.

In another aspect, the second component 904 or GATr can be configured to enable the first equilinear layer 1102 to receive the multivector inputs and generate a first equilinear layer output. The input equilinear layer output can be provided to the transformer block 1101 which includes novel layers and components. The first normalization layer 1104 in the transformer block 1101 receives the first equilinear layer output and generates a first normalization layer output. The second equilinear layer 1106 in the transformer block 1101 receives the first normalization layer output and generates a first equilinear layer output. The geometric attention layer 1108 receives the first equilinear layer output and generates a geometric attention layer output. The third equilinear layer 1110 receives the geometric attention layer output and generates a third equilinear layer output. The first equilinear layer output is added to the third equilinear layer output via the first addition component 1112 that generates a first addition component output.

A second normalization layer 1114 receives the first addition component output and generates a second equilinear normalization layer output. The fourth equilinear layer 1116 receives the first addition component output and generates a fourth equilinear layer output. The geometric bilinear layer 1118 receives the fourth equilinear layer output and generates a geometric bilinear layer output. The scalar-gated Gaussian Error Linear Units (GeLU) nonlinearity layer or GeLU nonlinearity layer 1120 receives the geometric bilinear layer output and generates GeLU output. The fifth equilinear layer 1122 receives the GeLU output and generates fifth equilinear layer output. The second addition component 1124 adds the fifth equilinear layer output and the first addition component output to generate a second addition component output. The sixth equilinear layer 1126 receives and processes the second addition component output to generate multivector outputs.

Figure 12:
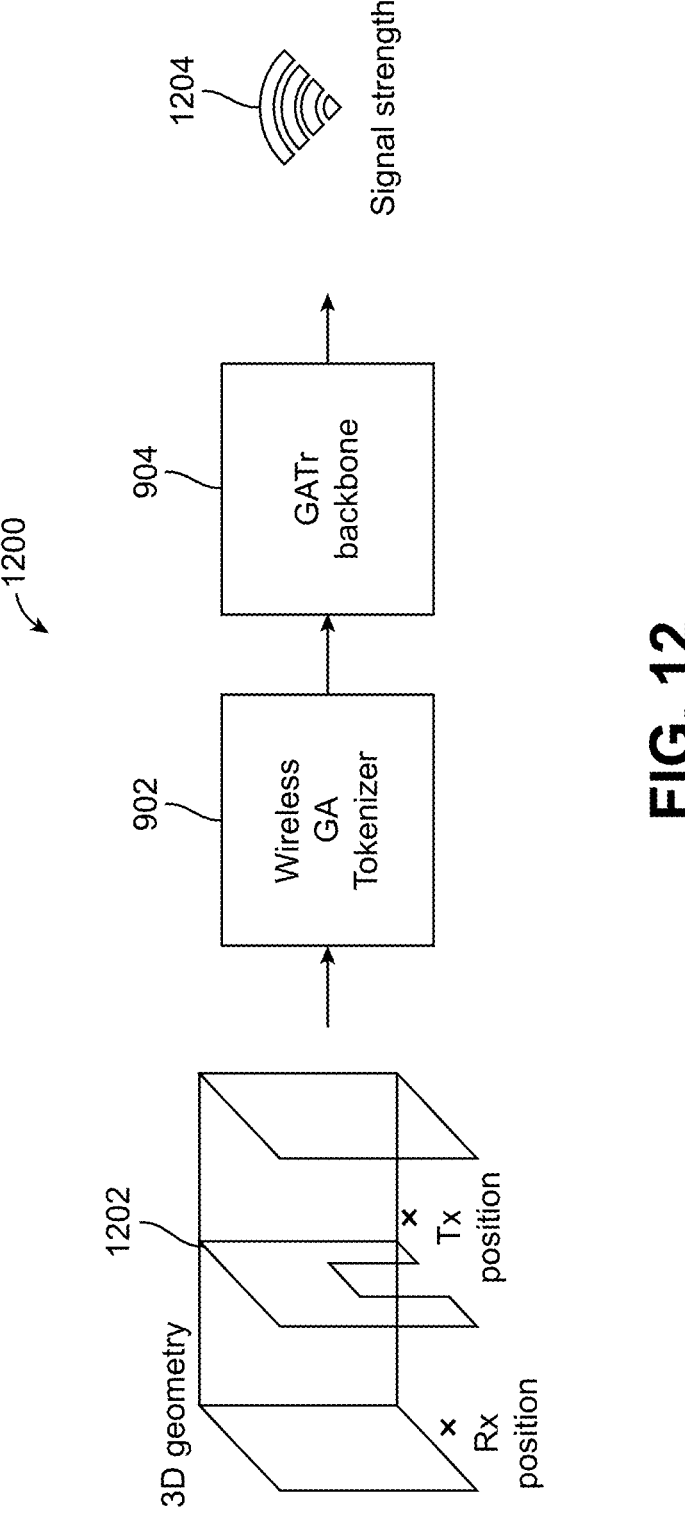
FIG. 12 is a diagram illustrating an example or predictive modelling, according to aspects of the disclosure.

FIG. 12 is a diagram illustrating an example or predictive modelling 1200. Given a three-dimensional geometry 1202 and a transmitter and receiver position, the network (e.g., the first component 902 and the second component 904) predicts link properties or reference signal received power (RSRP). The network is trained on simulated or measured data with regression objective (e.g., MSE or mean square error). The training approach produces a neural surrogate with several advantages over simulators that use ray tracing techniques. The approach can be faster and differentiable and thus allows for inverse problem solving through gradient descent. The network can also be trained or fine-tuned on real measurements.

Figure 13:
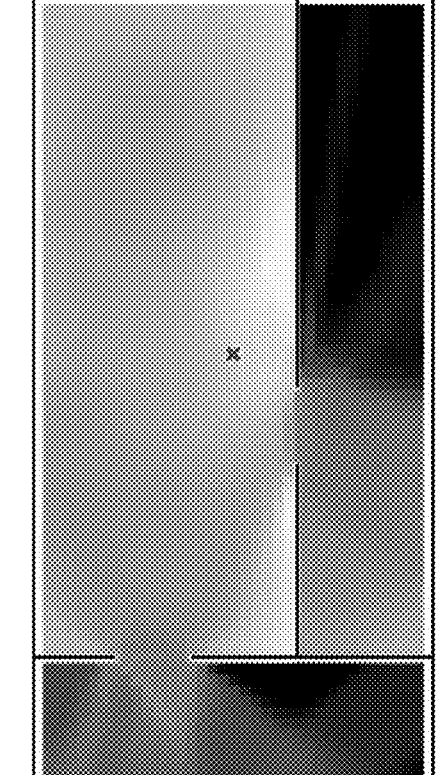
FIG. 13 is a diagram illustrating wireless prediction of the reference signal received power for a geometric algebra transformer, according to aspects of the disclosure.

FIG. 13 is a diagram illustrating wireless prediction of the reference signal received power for a geometric algebra transformer 1300 for the second component 904 or GATr. The graph illustrates the RSRP prediction values through a three-dimensional geometric scene.

Figure 14:
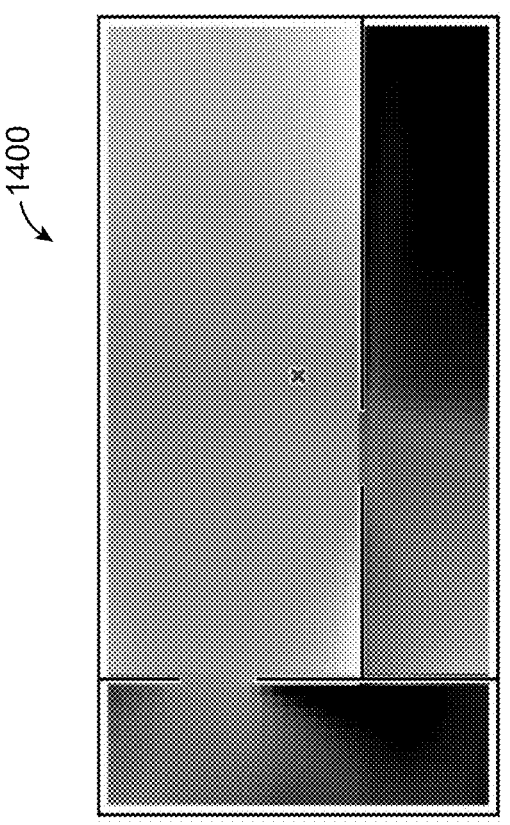
FIG. 14 is a diagram illustrating wireless prediction of the reference signal received power for a traditional transformer, according to aspects of the disclosure.

FIG. 14 is a diagram illustrating wireless prediction of the reference signal received power for a traditional transformer 1400 and provides a baseline result for RSRP prediction in the three-dimensional geometric scene.

Figure 15:
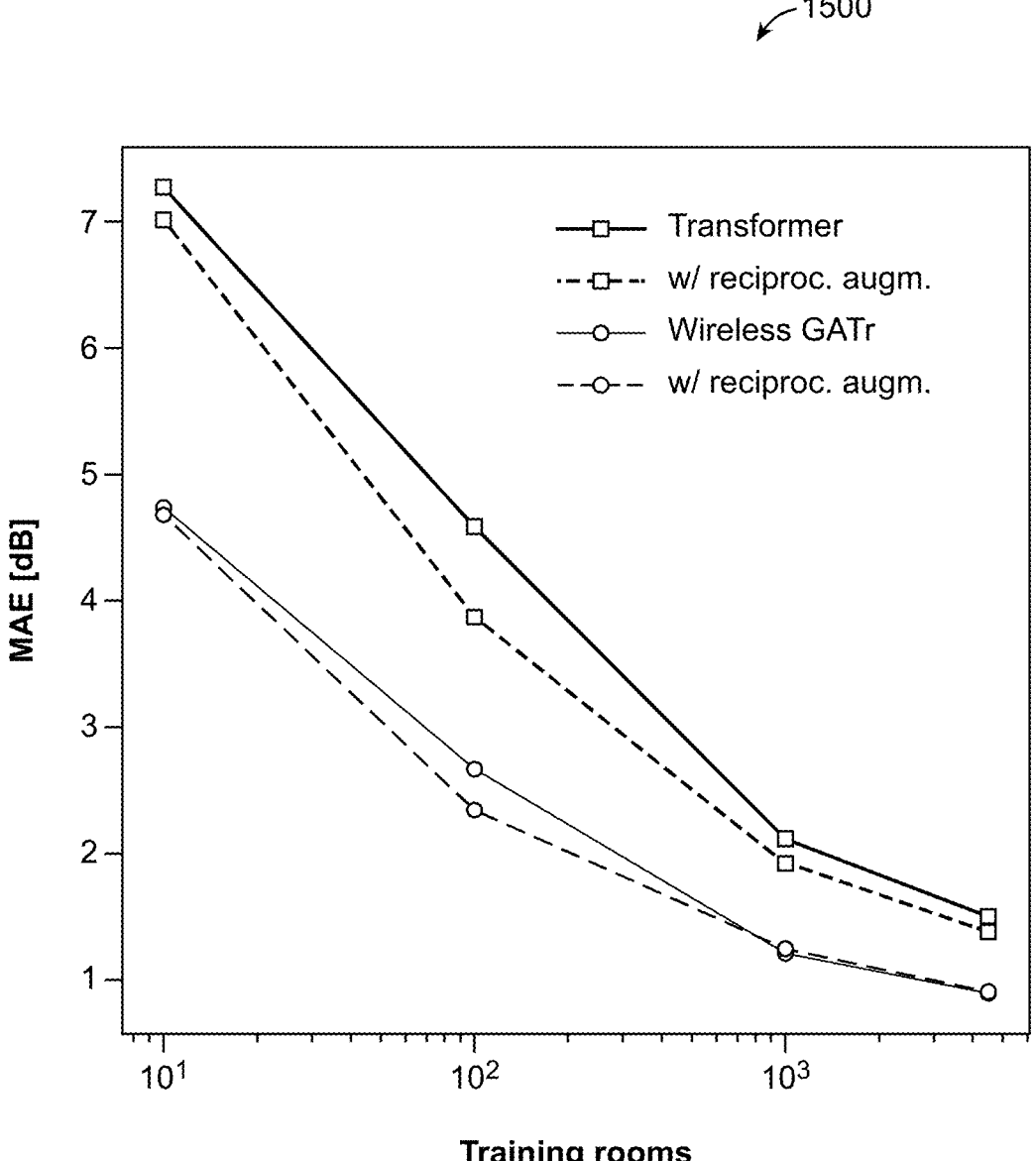
FIG. 15 is a diagram illustrating the results of reference signal received power prediction for various transformers, according to aspects of the disclosure.

FIG. 15 is a diagram illustrating the results of reference signal received power prediction for various transformers 1500, according to aspects of the disclosure. The second component 904 or GATr needs five to ten times less data than a transformer for the same prediction quality. The graph compares the results for a transformer with and without reciprocal augmentation and a GATr network with and without reciprocal augmentation.

Figure 16:
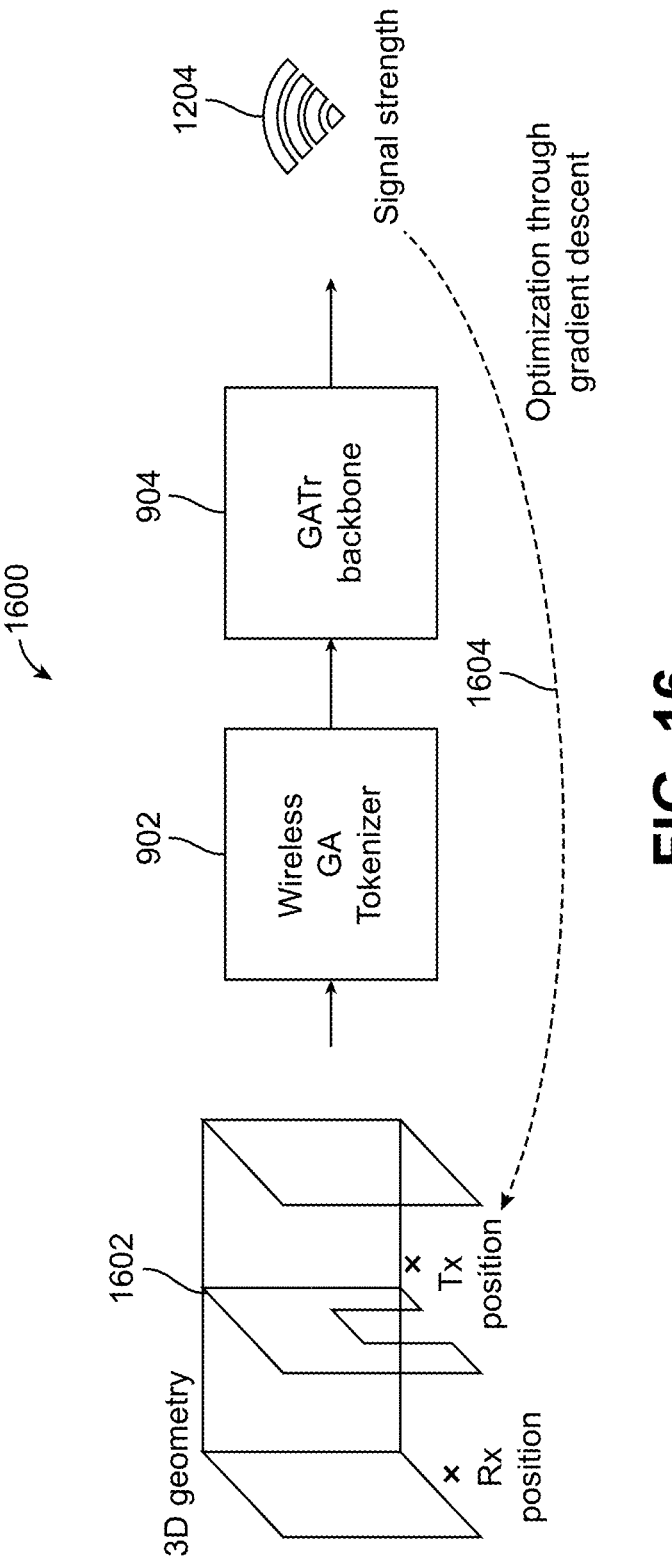
FIG. 16. is a diagram illustrating predictive modelling for inverse problems, according to aspects of the disclosure.

FIG. 16 is a diagram illustrating predictive modelling for inverse problems 1600, according to aspects of the disclosure. A three-dimensional geometry 1602 includes a receiver position and a transmitter position in a set of rooms with a door. The neural network which can include the first component 902 or wireless GA tokenizer and the second component 904 or the GATr generates the RSRP or signal strength mapping 1204. In some aspects, the signal strength mapping 1204 may be a measured signal strength map that is fed into the neural network to predict one or more characteristics of the three-dimensional geometry 1602. The use of neural surrogates is fast and differentiable (unlike ray tracers). The approach makes the neural network as disclosed more useful to infer scene properties from the measured signal strength. In an example, one can infer via an inference 1604 the transmitter or receiver position from the known three-dimensional geometry and the measure or predicted data such as the signal strength mapping 1204. The predictive modeling here is achieved by backpropagating through the model and optimizing the unknown properties with gradient descent. The loss function: error (e.g., MSE) can be calculated between model prediction and measurement.

Figure 17:
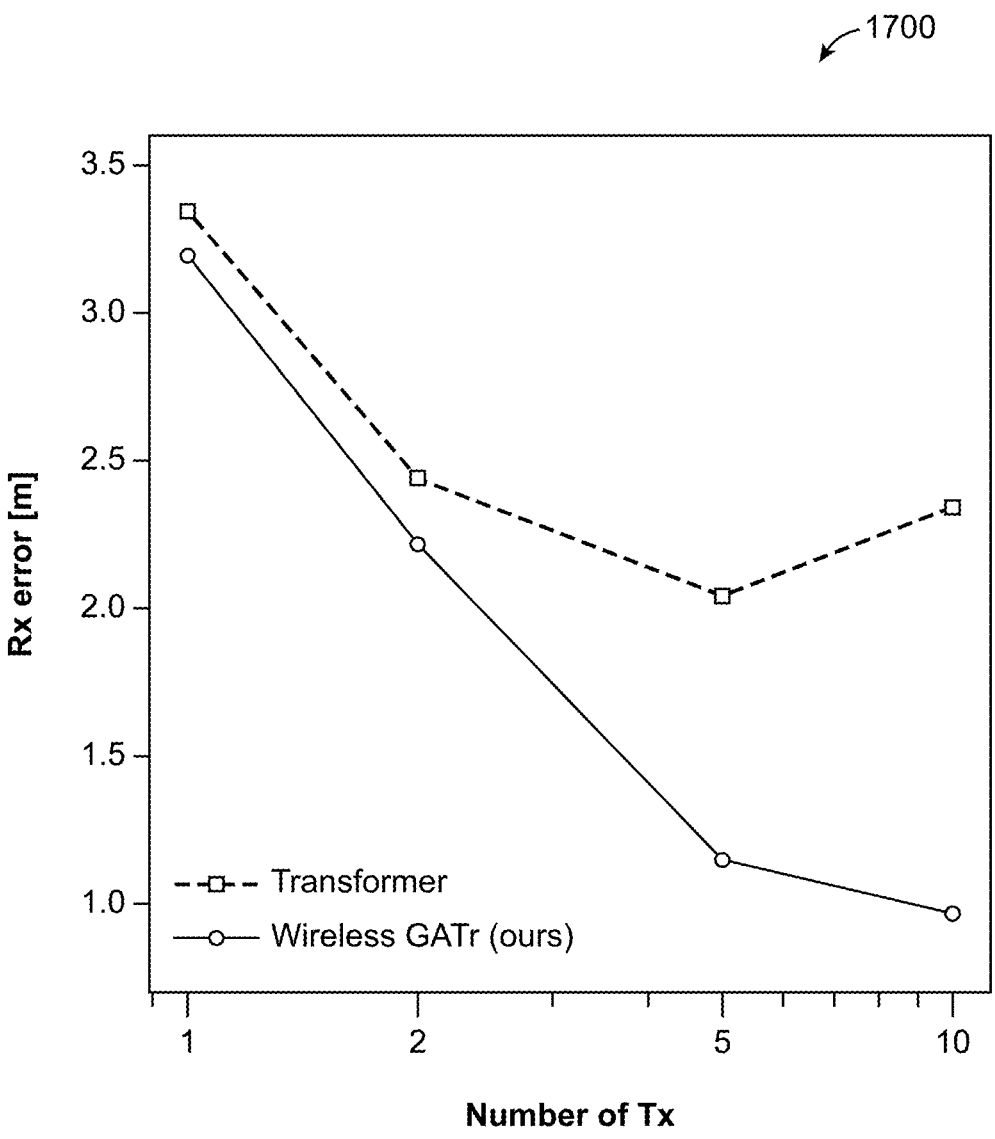
FIG. 17 is a diagram illustrating the results of receiver position in a three-dimensional space for various transformers, according to aspects of the disclosure.

FIG. 17 is a diagram illustrating the results of receiver position in a three-dimensional space for various transformers 1700, according to aspects of the disclosure. In the diagram, the results show that the second component 904 or GATr allows for twice the precision on positioning than a transformer given sufficient transmitter data. For example, the error in inferring the receiver position is reduced more for the second component 904 or GATr than a transformer when there are a number of transmitters used, such as from five to ten transmitters.

Figure 18:
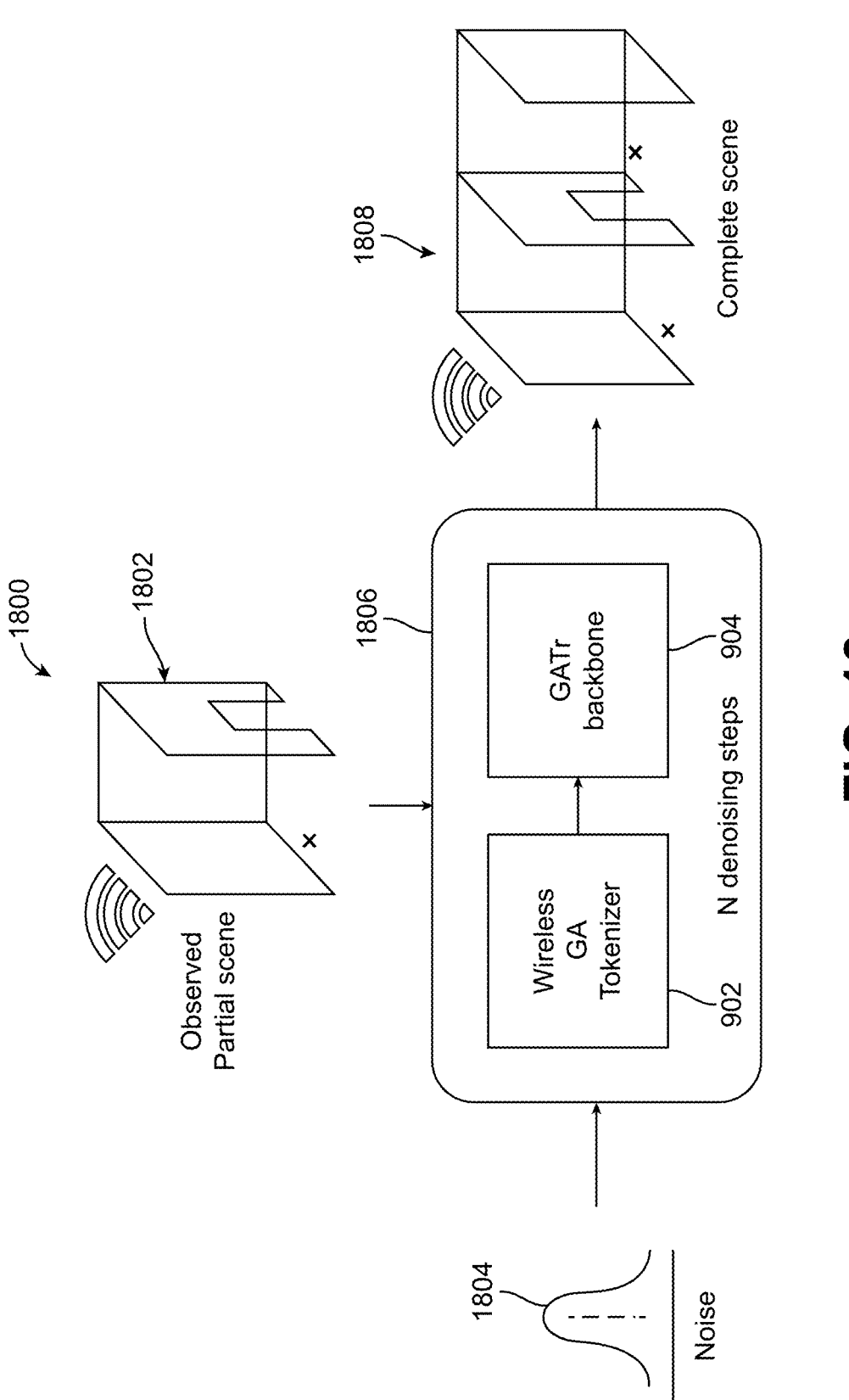
FIG. 18 is a diagram illustrating a diffusion model for probabilistic modeling for scene characteristics, according to aspects of the disclosure.

FIG. 18 is a diagram illustrating a diffusion model for probabilistic modeling for scene characteristics 1800, according to aspects of the disclosure. A diffusion model 1806 can receive an observed partial scene 1802 that can include some data such as data about walls and a transmitter or receiver. Noise 1804 can be provided to the diffusion model and the diffusion model 1806 can include the first component 902 or the wireless GA tokenizer and the second component 904 or the GATr to perform N denoising steps. The output of the diffusion model 1806 can be a completed scene 1808 which can have, for example, one or more of features such as new walls, a new position of a transmitter or receiver, new doors, new material or any other feature associated with a three-dimensional scene.

Figure 19:
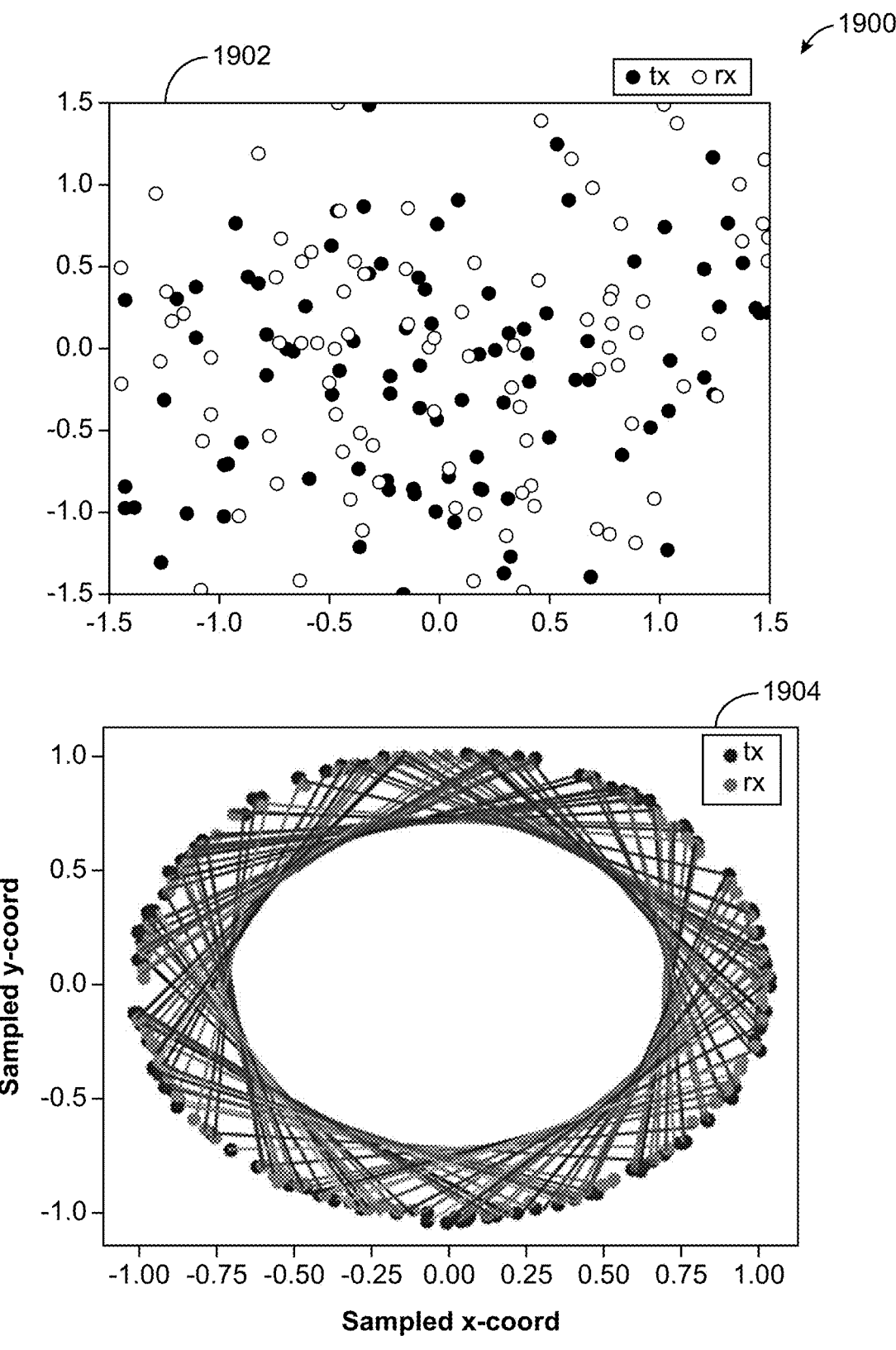
FIG. 19. is a diagram a diffusion setup for a diffusion model, according to aspects of the disclosure.

FIG. 19. is a diagram a diffusion setup 1900 for the diffusion model 1806, according to aspects of the disclosure. Formally, the aim is to model a joint distribution p(RSRP, Tx, Rx, mesh) using diffusion models, e.g. DDPM (denoising diffusion probabilistic models). The GATr symmetries theoretically allow generation of unseen scenes with:

$$p_{GATr}(RSRP, Tx, Rx, \text{mesh}) = \tag{3}$$

$$p_{GATr}(RSRP, f(Tx), f(Rx), f(\text{mesh})), f \in E.$$

A first graph 1902 shows a noisy distribution of positions for transmitters and receivers and a second graph 1904 shows the generated equivalence class in two-dimensions trained on a single transmitter/receiver location pair.

Figure 20:
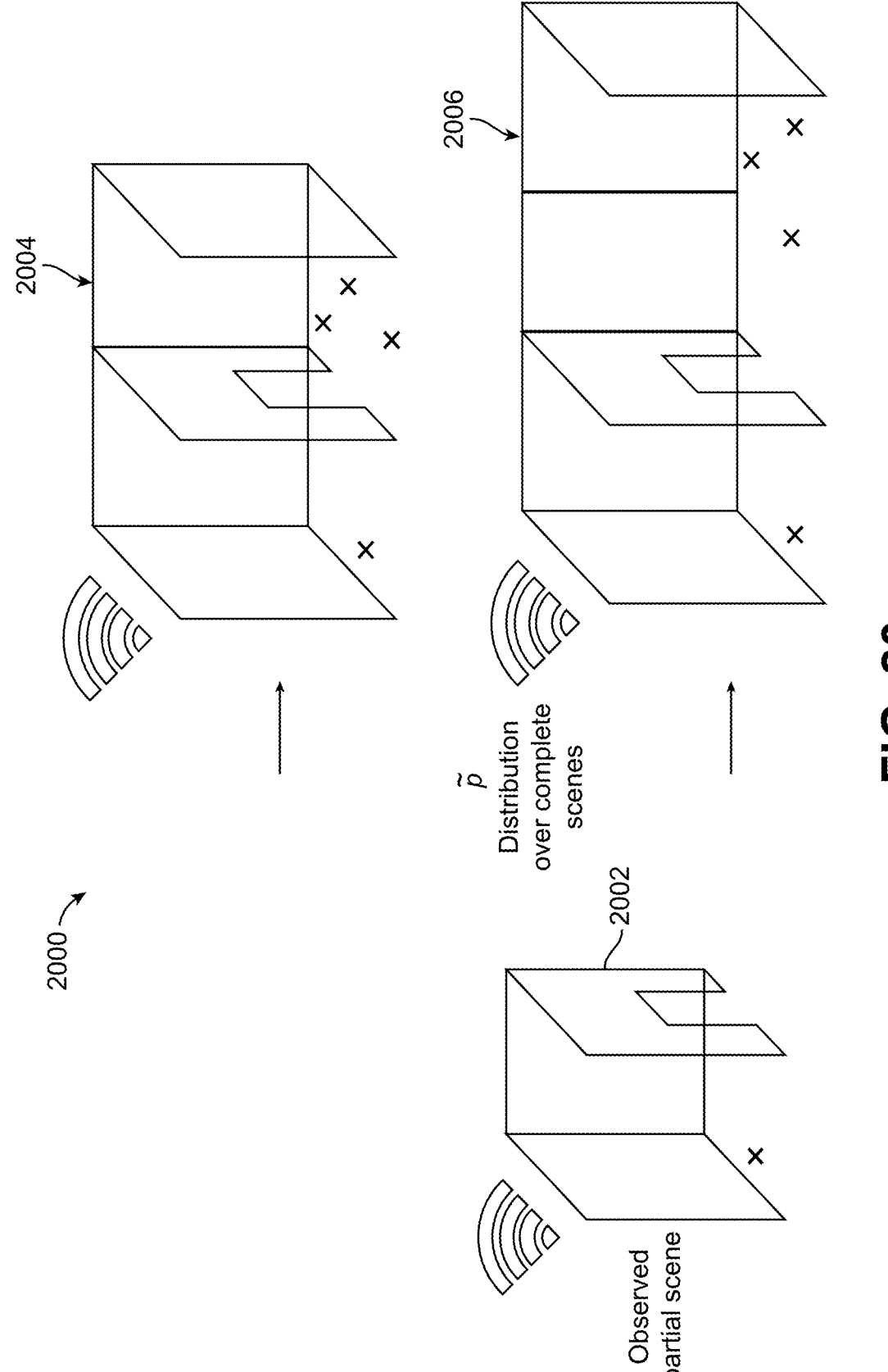
FIG. 20 is a diagram illustrating inference as inpainting, according to aspects of the disclosure.

FIG. 20 is a diagram illustrating inference as inpainting 2000, according to aspects of the disclosure. An observed partial scene 2002 is shown. Diffusion models allow for tractable sampling from posteriors of the form: $\tilde{p}(x) \propto p(x) \cdot r(x)$ in which the p(x) term is the diffusion model "prior" and the r (x) term is the weighting/reward/"likelihood" term. One can perform inpainting on partial information y, by setting $r(x)=1_{\Omega(x)=y}$, where $\Omega(x)$ selects a subset of coordinates in x. The approach allows for various use cases: such as (1) given y=Tx, Rx, mesh, one can infer RSRP; (2) Given y=Tx, mesh, RSRP, one can infer an Rx position 2004; (3) Given y=Tx, Rx, partial mesh, RSRP, one can infer a full mesh 2006. As can be seen in these figures, various items can be inferred for features in the scene including RSRP values and locations, transmitter/receiver positions and/or mesh or physical structures like walls, doors, etc.

FIG. 21 is a flow diagram illustrating a process 2100, according to aspects of the disclosure. The process 2100 can be performed by an apparatus that can include one or more of a neural network, a model 110, a first component 902 or wireless GA tokenizer, a second component 904 or GATr, a diffusion model 1806, a computing system 2200, a memory 2215, a cache 2212, a processor 2210 and/or any subcomponent or combination thereof.

At block 2102, the process 2100 includes an apparatus (e.g., one or more of a neural network, a model 110, a first component 902 or wireless GA tokenizer, a second component 904 or GATr, a diffusion model 1806, a computing system 2200, a memory 2215, a cache 2212, a processor 2210, and/or any subcomponent or combination thereof) being configure to, and does: receive a three-dimensional geometry, a transmitter position and a receiver position.

The encoding operation can further include encoding, at the wireless geometric algebra tokenizer or first component 902, the three-dimensional scene data, the transmitter position, the receiver position and the link information as the sequence of tokens. The encoding further can include encoding, at the wireless geometric algebra tokenizer, any combination of two or more of the three-dimensional scene data, the transmitter position, the receiver position and the link information as the sequence of tokens.

At block 2104, the process 2100 includes an apparatus (e.g., one or more of a neural network, a model 110, a first component 902 or wireless GA tokenizer, a second component 904 or GATr, a diffusion model 1806, a computing system 2200 and/or any subcomponent or combination thereof) being configure to, and does: predict, based on a neural network wireless channel model, network link properties related to one or more channel between the transmitter position and the receiver position. The neural network can include a geometric algebra transformer such as the second component 904 or GATr.

The N geometric algebraic multivectors can include 16-dimensional vectors that represent geometric data. In some aspects, the neural network is trained to process the sequence of tokens and to be equivariant with respect to rotations, translations and mirrorings.

In one example, the multivector that it is one unit with sixteen numbers in it. The sixteen-dimensional vector is structured such that each of the components of the vector has a particular type associated with it. For example, the first number may be a scalar number that could be any number that does not have a direction or location. The next three components can be a regular three-dimensional vector. There are several particular properties that apply to this structure. The first is that there is a well-established dictionary regarding how to represent different geometric objects. In other words, there is a rule for how to represent the position of an object. There may be another rule for how to represent object orientations and there can be rules for representing directions, lines, planes, and also for operators acting on objects like translations or rotations.

The above describes the first property of the multivector. A second property of the multivector is that there is one operation between the vectors known as the geometric product. The geometric product is a convenient operation because it allows for the computation of the typical operations that would be computed between geometric data with just a single operation. For example, the geometric product between two multivectors that each represent the coordinates of a point will identify the distance between the points. In another example, the geometric product between the representational point and that of a translation vector will identify how to shift the point by the amount of the translation vector. The geometric product is one operation that implements a lot of typical geometric operations.

A scalar product between two vectors provides a single number and a cross product between two vectors provides another vector. Both of these operations are generalized in geometric algebra and in the geometric product between multivectors. The geometric product maps two multivectors into another multivector and the output contains both the typical scalar product and the typical cross product.

Therefore, using the multivector structure as the data representation as described herein and using the geometric product as an operation between multivectors is part of the underlying idea of the geometric algebra transformer. The result is one data type and an associated standard operation that can essentially describe all the data types and operations that are expected to occur often in a three-dimensional environment. With few parameters in the neural network, the system can learn typical operations easily.

In some aspects, the sequence of tokens includes multivector inputs to the neural network. The multi-vector inputs can include embedded geometric objects. In some aspects, the embedded geometric objects are embedded into the multi-vector inputs using a geometric algebra embedding component. The embedded geometric objects can include at least one of a scalar, a vector, a bivector, a trivector, or a pseudoscalar.

In some aspects, the second component 904 or GATr further can include an input equilinear layer; a transformer block; and an output equilinear layer. The geometric algebra transformer (or second component 904) further can include a plurality of transformer blocks as shown in FIG. 11. Each transformer block 1101 can include a first normalization layer 1104; an equilinear layer such as the second equilinear layer 1106; a geometric attention layer 1108; a first geometric product engine; another equilinear layer such as the third equilinear layer 1110; a first addition component 1112; a second normalization layer 1114; another equilinear layer such as the fourth equilinear layer 1116; a geometric bilinear layer 1118; a scalar-gated nonlinearity layer; another equilinear layer such as the fifth equilinear layer 1122; and a second addition component 1124.

The scalar-gated nonlinearity layer can include a scalar-gated Gaussian Error Linear Units nonlinearity layer such as such as the gated GeLU layer or GeLU nonlinearity layer 1120. The three-dimensional scene data can be encoded into a respective mesh face token per mesh face, wherein the respective mesh face token comprises one or more of a mesh face center position, vertex positions, relative vertex position from a center of the mesh face, mesh face plane vector, mesh face normal vector and material properties.

In some aspects, the transmitter position is encoded into a transmitter position token which can include one or more of a transmitter position and a transmitter antenna orientation. The receiver position can be encoded into a receiver position token which can include one or more of a receiver position and a receiver antenna orientation. The link information can be encoded into a link token which comprises one or more of a signal strength, a phase and a delay.

An apparatus for using a neural network as disclosed herein can include at least one memory (e.g., a memory configured in circuitry such as one or more of memory 2215, memory 2220, random-access memory 2225 and/or cache 2212) and at least one processor (e.g., processor 2210)

coupled to the at least one memory and configured to: receive (e.g., via the second component 904 or GATr) multivector inputs processed from raw data associated with a three-dimensional space and process (e.g., via the second component 904 or GATr) the multivector inputs to generate multivector outputs, wherein the geometric algebra transformer is trained (1) to process geometric algebra representations associated with the multivector inputs and (2) to be equivariant with respect to translations and rotations.

In some aspects, an apparatus is disclosed to predict link properties between a transmitter and a receiver in a three-dimensional space, the apparatus including: one or more processor; and a computer-readable medium storing instructions which, when executed by the one or more processor, cause the one or more processor to be configured to: receive a three-dimensional geometry, a transmitter position and a receiver position; and predict, based on a neural network wireless channel model or model 110, network link properties related to one or more channel between the transmitter position and the receiver position.

In some aspects, an apparatus is disclosed to predict link properties between a transmitter and a receiver in a three-dimensional space, the apparatus including: one or more means for receiving a three-dimensional geometry, a transmitter position and a receiver position; and means for predicting, based on a neural network wireless channel model or model 110, network link properties related to one or more channel between the transmitter position and the receiver position.

In some aspects, a computer-readable medium is disclosed for storing instructions which, when executed by the one or more processor, cause the one or more processor to be configured to: receive a three-dimensional geometry, a transmitter position and a receiver position; and predict, based on a neural network wireless channel model or model 110, network link properties related to one or more channel between the transmitter position and the receiver position.

In another aspect, a computer-implemented method to infer scene properties in a three-dimensional space is disclosed. The computer-implemented method including: receiving a three-dimensional geometry and a signal strength data associated with the three-dimensional geometry; and inferring, based on the signal strength data and a neural network wireless channel model or model 110, a scene property related to the three-dimensional geometry.

In some aspects, an apparatus is disclosed to infer scene properties in a three-dimensional space, the apparatus comprising: one or more processor; and a computer-readable medium storing instructions which, when executed by the one or more processor, cause the one or more processor to be configured to: receive a three-dimensional geometry and a signal strength data associated with the three-dimensional geometry; and infer, based on the signal strength data and a neural network wireless channel model or model 110, a scene property related to the three-dimensional geometry.

In some aspects, an apparatus to infer scene properties in a three-dimensional space is disclosed, the apparatus including: one or more means for receiving a three-dimensional geometry and a signal strength data associated with the three-dimensional geometry; and means for inferring, based on the signal strength data and a neural network wireless channel model or model 110, a scene property related to the three-dimensional geometry.

In some aspects, a computer-readable medium is disclosed for storing instructions which, when executed by the one or more processor, cause the one or more processor to be configured to: receive a three-dimensional geometry and a signal strength data associated with the three-dimensional geometry; and infer, based on the signal strength data and a neural network wireless channel model or model 110, a scene property related to the three-dimensional geometry.

Figure 22:
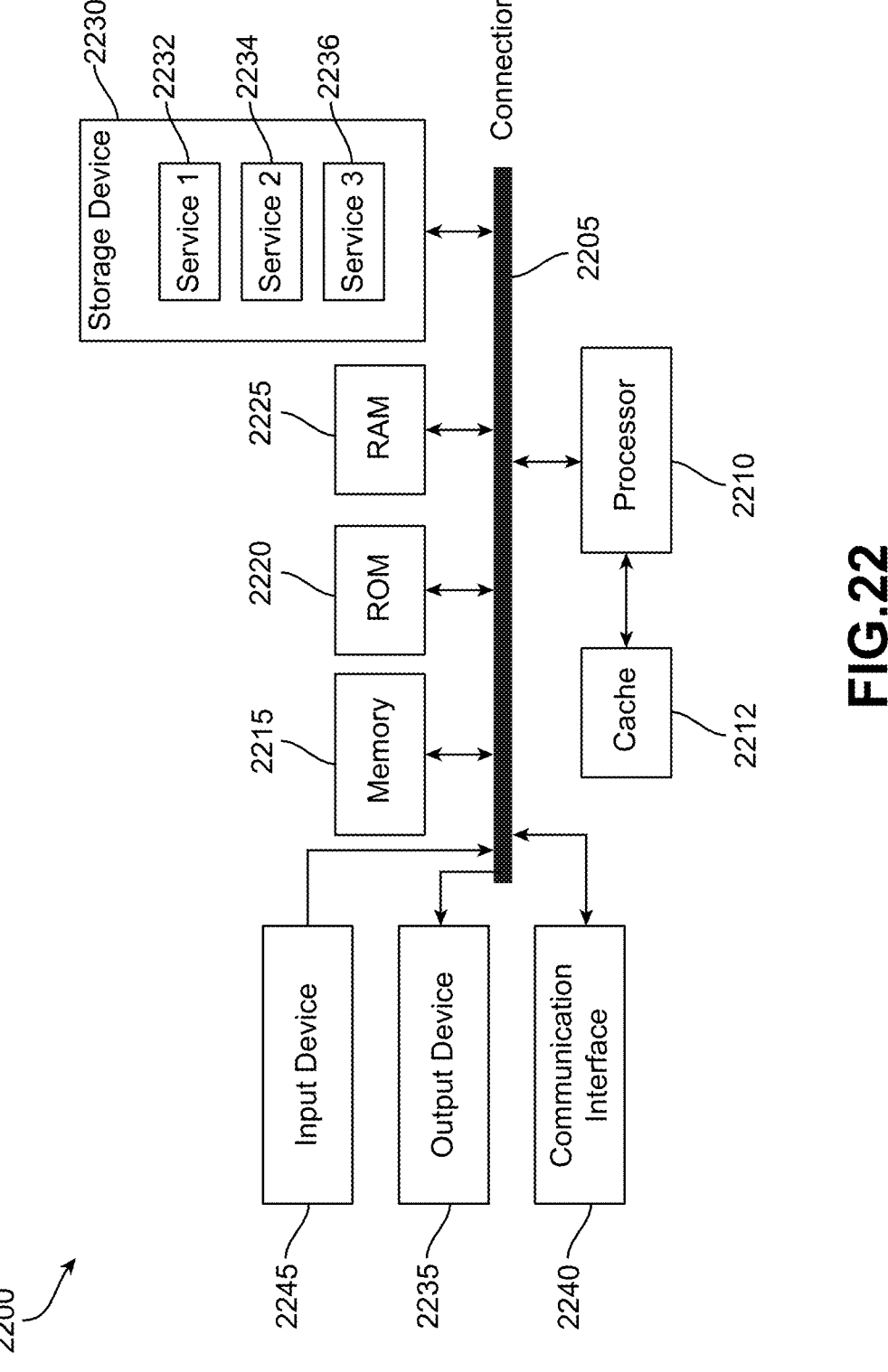
FIG. 22 is a diagram illustrating an example of a computing system, according to aspects of the disclosure.

FIG. 22 is a diagram illustrating an example of a system for implementing certain aspects of the present technology. In particular, FIG. 22 illustrates an example of computing system 2200, which can be for example any computing device making up internal computing system, a remote computing system, a camera, a depth map or multiple depth maps, or any component thereof in which the components of the system are in communication with each other using connection 2205. Connection 2205 can be a physical connection using a bus, or a direct connection into processor 2210, such as in a chipset architecture. Connection 2205 can also be a virtual connection, networked connection, or logical connection.

In some aspects, computing system 2200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 2200 includes at least one processing unit (CPU or processor 2210) and connection 2205 that couples various system components including memory 2215, such as read-only memory (ROM) 2220 and random-access memory 2225 (RAM) to processor 2210. Computing system 2200 can include a cache 2212 of high-speed memory connected directly with, in close proximity to, or integrated as part of processor 2210.

Processor 2210 can include any general-purpose processor and a hardware service or software service, such as services such as a first service 2232, a second service 2234, and a third service 2236 stored in storage device 2230, configured to control processor 2210 as well as a special-purpose processor where software instructions are incorporated into the actual processor design. Processor 2210 may essentially be a completely self-contained computing system, containing multiple cores or processors, a bus, memory controller, cache, etc. A multi-core processor may be symmetric or asymmetric.

To enable user interaction, computing system 2200 includes an input device 2245, which can represent any number of input mechanisms, such as a microphone for speech, a touch-sensitive screen for gesture or graphical input, keyboard, mouse, motion input, speech, etc. Computing system 2200 can also include output device 2235, which can be one or more of a number of output mechanisms. In some instances, multimodal systems can enable a user to provide multiple types of input/output to communicate with computing system 2200. Computing system 2200 can include communications interface 2240, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC)

wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 2240 may also include one or more GNSS receivers or transceivers that are used to determine a location of the computing system 2200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 2230 can include software services, servers, services, etc., that when the code that defines such software is executed by the processor 2210, it causes the system to perform a function. In some aspects, a hardware service that performs a particular function can include the software component stored in a computer-readable medium in connection with the necessary hardware components, such as processor 2210, connection 2205, output device 2235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, engines, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules, engines, or components may be implemented together in an integrated logic device or separately as discrete but interoperable logic devices. If implemented in software, then the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A processor-implemented method of processing data using a geometric algebra transformer, the processor-implemented method comprising: encoding, at a wireless geometric algebra tokenizer, one or more of three-dimensional scene data, a transmitter position, a receiver position and link information as a sequence of tokens which are geometric algebra representations; and processing, at a neural network or model 110, the sequence of tokens to generate output comprising N geometric algebraic multivectors and M scalars to jointly model a relationship between the three-dimensional scene data, the transmitter position, the receiver position and wireless channels.

Aspect 2. The processor-implemented method of Aspect 1, wherein the neural network comprises a geometric algebra transformer.

Aspect 3. The processor-implemented method of Aspect 1 or any previous Aspect, wherein the encoding further comprises encoding, at the wireless geometric algebra tokenizer, the three-dimensional scene data, the transmitter position, the receiver position and the link information as the sequence of tokens.

Aspect 4. The processor-implemented method of Aspect 1 or any previous Aspect, wherein the encoding further comprises encoding, at the wireless geometric algebra tokenizer, any combination of two or more of the three-dimensional scene data, the transmitter position, the receiver position and the link information as the sequence of tokens.

Aspect 5. The processor-implemented method of Aspect 1 or any previous Aspect, wherein the N geometric algebraic multivectors comprise 16-dimensional vectors that represent geometric data.

Aspect 6. The processor-implemented method of Aspect 1 or any previous Aspect, wherein the neural network is trained to process the sequence of tokens and to be equivariant with respect to rotations, translations and mirrorings.

Aspect 7. The processor-implemented method of Aspect 1 or any previous Aspect, wherein the sequence of tokens comprises multi-vector inputs to the neural network.

Aspect 8. The processor-implemented method of Aspect 7 or any of Aspects 1-6, wherein the multi-vector inputs comprise embedded geometric objects.

Aspect 9. The processor-implemented method of Aspect 8 or any of Aspects 1-7, wherein the embedded geometric objects are embedded into the multi-vector inputs using a geometric algebra embedding component.

Aspect 10. The processor-implemented method of Aspect 8 or any of Aspects 1-7 or 9, wherein the embedded geometric objects comprise at least one of a scalar, a vector, a bivector, a trivector, or a pseudoscalar.

Aspect 11. The processor-implemented method of Aspect 2 or any of Aspects 3-10, wherein the geometric algebra transformer further comprises: an input equilinear layer; a transformer block; and an output equilinear layer.

Aspect 12. The processor-implemented method of Aspect 11 or any of Aspects 1-10, wherein the geometric algebra transformer further comprises a plurality of transformer blocks.

Aspect 13. The processor-implemented method of Aspect 11 or any of Aspects 1-10 or 12, wherein the transformer block further comprises: a first normalization layer; a first equilinear layer; a geometric attention layer; a first geometric product engine; a second equilinear layer; a first addition engine; a second normalization layer; a third equilinear layer; a geometric bilinear layer; a scalar-gated nonlinearity layer; a fourth equilinear layer; and a second addition engine.

Aspect 14. The processor-implemented method of Aspect 13 or any of Aspects 1-12, wherein the scalar-gated nonlinearity layer comprises a scalar-gated Gaussian Error Linear Units nonlinearity layer.

Aspect 15. The processor-implemented method of Aspect 1 or any of Aspects 2-14, wherein the three-dimensional scene data is encoded into a respective mesh face token per mesh face, wherein the respective mesh face token comprises one or more of a mesh face center position, vertex positions, relative vertex position from a center of the mesh face, mesh face plane vector, mesh face normal vector and material properties.

Aspect 16. The processor-implemented method of Aspect 1 or any of Aspects 2-15, wherein the transmitter position is encoded into a transmitter position token which comprises one or more of a transmitter position and a transmitter antenna orientation.

Aspect 17. The processor-implemented method of Aspect 1 or any of Aspects 2-16, wherein the receiver position is encoded into a receiver position token which comprises one or more of a receiver position and a receiver antenna orientation.

Aspect 18. The processor-implemented method of Aspect 1 or any of Aspects 2-17, wherein the link information is encoded into a link token which comprises one or more of a signal strength, a phase and a delay.

Aspect 19. An apparatus to predict link properties between a transmitter and a receiver in a three-dimensional space, the apparatus comprising: one or more processor; and a computer-readable medium storing instructions which, when executed by the one or more processor, cause the one or more processor to be configured to: receive a three-dimensional geometry, a transmitter position and a receiver position; and predict, based on a neural network wireless channel model, network link properties related to one or more channel between the transmitter position and the receiver position.

Aspect 20. The apparatus of Aspect 19, wherein the neural network wireless channel model comprises a wireless geometric algebra tokenizer and a geometric algebra transformer.

Aspect 21. The apparatus of Aspect 19 or Aspect 20, wherein the transmitter position and the receiver position are within the three-dimensional geometry.

Aspect 22. The apparatus of Aspect 19 or any of Aspects 20-21, wherein: the neural network wireless channel model encodes the three-dimensional geometry into a mesh face token per mesh face associated with the three-dimensional geometry, wherein each mesh-face token comprises one or more of a mesh face center position, vertex positions, relative vertex position from a center of the mesh face, mesh face plane vector, mesh face normal vector and material properties; the neural network wireless channel model encodes the transmitter position into a transmitter position token which comprises one or more of a transmitter position and a transmitter antenna orientation; and the neural network wireless channel model encodes the receiver position into a receiver position token which comprises one or more of a receiver position and a receiver antenna orientation.

Aspect 23. The apparatus of Aspect 19 or any of Aspects 20-22, wherein the neural network wireless channel model is trained on simulated data or measured data with a regressive objective.

Aspect 24. An apparatus to infer scene properties in a three-dimensional space, the apparatus comprising: one or more processor; and a computer-readable medium storing instructions which, when executed by the one or more processor, cause the one or more processor to be configured to: receive a three-dimensional geometry and a signal strength data associated with the three-dimensional geometry; and infer, based on the signal strength data and a neural network wireless channel model, a scene property related to the three-dimensional geometry.

Aspect 25. The apparatus of Aspect 24, wherein the neural network wireless channel model comprises a wireless geometric algebra tokenizer and a geometric algebra transformer.

Aspect 26. The apparatus of Aspect 24 or Aspect 25, wherein inferring the scene property occurs via backpropagation through the neural network wireless channel model and optimizing unknown properties with gradient descent.

Aspect 27. The apparatus of Aspect 26 or any of Aspects 20-25, wherein the scene property comprises one or more of a transmitter position within the three-dimensional geometry and a receiver position within the three-dimensional geometry and wherein inferring one or more of the transmitter position within the three-dimensional geometry and the receiver position within the three-dimensional geometry occurs via backpropagation through the neural network wireless channel model and optimizing unknown properties with gradient descent.

Aspect 28. The apparatus of Aspect 27 or any of Aspects 20-26, wherein: the neural network wireless channel model encodes the three-dimensional geometry into a mesh face token per mesh face associated with the three-dimensional geometry, wherein each mesh-face token comprises one or more of a mesh face center position, vertex positions, relative vertex position from a center of the mesh face, mesh face plane vector, mesh face normal vector and material properties; the neural network wireless channel model encodes the transmitter position into a transmitter position token which comprises one or more of a transmitter position and a transmitter antenna orientation; and the neural network wireless channel model encodes the receiver position into a receiver position token which comprises one or more of a receiver position and a receiver antenna orientation.

Aspect 29. The apparatus of Aspect 24 or any of Aspects 20-23 or 25-28, wherein the scene property comprises one or more of a wall position within the three-dimensional geometry, a wall orientation, a transmitter property, a receiver property.

Aspect 30. The apparatus of Aspect 29 or any of Aspects 20-28, wherein inferring the wall position within the three-dimensional geometry occurs via a diffusion process wherein the three-dimensional geometry comprises an observed partial scene and the scene property comprises a complete scene.

Aspect 31. An apparatus to predict link properties between a transmitter and a receiver in a three-dimensional space, the apparatus comprising: one or more processor; and a computer-readable medium storing instructions which, when executed by the one or more processor, cause the one or more processor to be configured to: encode, at a wireless geometric algebra tokenizer, one or more of three-dimensional scene data, a transmitter position, a receiver position and link information as a sequence of tokens which are geometric algebra representations; and process, at a neural network, the sequence of tokens to generate output comprising N geometric algebraic multivectors and M scalars to jointly model a relationship between the three-dimensional scene data, the transmitter position, the receiver position and wireless channels.

Aspect 32. A computer-implemented process to predict link properties between a transmitter and a receiver in a three-dimensional space, the computer-implemented process comprising: receiving a three-dimensional geometry, a transmitter position and a receiver position; and predicting, based on a neural network wireless channel model, network link properties related to one or more channel between the transmitter position and the receiver position.

Aspect 33. A computer-implemented process to predict link properties between a transmitter and a receiver in a three-dimensional space, the computer-implemented process comprising: receiving a three-dimensional geometry and a signal strength data associated with the three-dimensional geometry; and inferring, based on the signal strength data and a neural network wireless channel model, a scene property related to the three-dimensional geometry.

Aspect 34. An apparatus to infer scene properties in a three-dimensional space, the apparatus comprising: one or more processor; and a computer-readable medium storing instructions which, when executed by the one or more processor, cause the one or more processor to be configured to: receive a three-dimensional geometry and a signal strength data associated with the three-dimensional geometry; and infer, based on the signal strength data and a neural network wireless channel model, a scene property related to the three-dimensional geometry.

Aspect 35. An apparatus to infer scene properties in a three-dimensional space, the apparatus including: one or more means for receiving a three-dimensional geometry and a signal strength data associated with the three-dimensional geometry; and means for inferring, based on the signal strength data and a neural network wireless channel model, a scene property related to the three-dimensional geometry.

Aspect 36. A computer-readable medium storing instructions which, when executed by the one or more processor, cause the one or more processor to be configured to: receive a three-dimensional geometry and a signal strength data associated with the three-dimensional geometry; and infer, based on the signal strength data and a neural network wireless channel model, a scene property related to the three-dimensional geometry.

What is claimed is:

1. A processor-implemented method of processing data using a geometric algebra transformer, the processor-implemented method comprising:

encoding, at a wireless geometric algebra tokenizer, one or more of three-dimensional scene data, a transmitter position, a receiver position and link information as a sequence of tokens which are geometric algebra representations; and processing, at a neural network, the sequence of tokens to generate output comprising N geometric algebraic multivectors and M scalars to jointly model a relationship between the three-dimensional scene data, the transmitter position, the receiver position and wireless channels.

2. The processor-implemented method of claim 1, wherein the neural network comprises a geometric algebra transformer.

3. The processor-implemented method of claim 1, wherein the encoding further comprises encoding, at the wireless geometric algebra tokenizer, the three-dimensional scene data, the transmitter position, the receiver position and the link information as the sequence of tokens.

4. The processor-implemented method of claim 1, wherein the encoding further comprises encoding, at the wireless geometric algebra tokenizer, any combination of two or more of the three-dimensional scene data, the transmitter position, the receiver position and the link information as the sequence of tokens.

5. The processor-implemented method of claim 1, wherein the N geometric algebraic multivectors comprise 16-dimensional vectors that represent geometric data.

6. The processor-implemented method of claim 1, wherein the neural network is trained to process the sequence of tokens and to be equivariant with respect to rotations, translations and mirrorings.

7. The processor-implemented method of claim 1, wherein the sequence of tokens comprises multi-vector inputs to the neural network.

8. The processor-implemented method of claim 7, wherein the multi-vector inputs comprise embedded geometric objects.

9. The processor-implemented method of claim 8, wherein the embedded geometric objects are embedded into the multi-vector inputs using a geometric algebra embedding component.

10. The processor-implemented method of claim 8, wherein the embedded geometric objects comprise at least one of a scalar, a vector, a bivector, a trivector, or a pseudoscalar.

11. The processor-implemented method of claim 2, wherein the geometric algebra transformer further comprises:

an input equilinear layer;
a transformer block; and
an output equilinear layer.

12. The processor-implemented method of claim 11, wherein the geometric algebra transformer further comprises a plurality of transformer blocks.

13. The processor-implemented method of claim 11, wherein the transformer block further comprises:

a first normalization layer;
a first equilinear layer;
a geometric attention layer;
a first geometric product engine;
a second equilinear layer;
a first addition engine;
a second normalization layer;
a third equilinear layer;
a geometric bilinear layer;
a scalar-gated nonlinearity layer;
a fourth equilinear layer; and
a second addition engine.

14. The processor-implemented method of claim 13, wherein the scalar-gated nonlinearity layer comprises a scalar-gated Gaussian Error Linear Units nonlinearity layer.

15. The processor-implemented method of claim 1, wherein the three-dimensional scene data is encoded into a respective mesh face token per mesh face, wherein the respective mesh face token comprises one or more of a mesh face center position, vertex positions, relative vertex position from a center of the mesh face, mesh face plane vector, mesh face normal vector and material properties.

16. The processor-implemented method of claim 1, wherein the transmitter position is encoded into a transmitter position token which comprises one or more of a transmitter position and a transmitter antenna orientation.

17. The processor-implemented method of claim 1, wherein the receiver position is encoded into a receiver position token which comprises one or more of a receiver position and a receiver antenna orientation.

18. The processor-implemented method of claim 1, wherein the link information is encoded into a link token which comprises one or more of a signal strength, a phase and a delay.

19. An apparatus to predict link properties between a transmitter and a receiver in a three-dimensional space, the apparatus comprising:

one or more processor; and
a computer-readable medium storing instructions which, when executed by the one or more processor, cause the one or more processor to be configured to:
receive a three-dimensional geometry, a transmitter position and a receiver position; and
predict, based on a neural network wireless channel model, network link properties related to one or more channel between the transmitter position and the receiver position.

20. An apparatus to infer scene properties in a three-dimensional space, the apparatus comprising:

one or more processor; and
a computer-readable medium storing instructions which, when executed by the one or more processor, cause the one or more processor to be configured to:
receive a three-dimensional geometry and a signal strength data associated with the three-dimensional geometry; and
infer, based on the signal strength data and a neural network wireless channel model, a scene property related to the three-dimensional geometry.

* * * * *